(12) United States Patent
Hou et al.

(10) Patent No.: US 12,074,672 B2
(45) Date of Patent: *Aug. 27, 2024

(54) ELECTRONIC DEVICE, WIRELESS COMMUNICATION METHOD AND COMPUTER-READABLE MEDIUM

(71) Applicant: Sony Group Corporation, Tokyo (JP)

(72) Inventors: Yanzhao Hou, Beijing (CN); Xiaofeng Tao, Beijing (CN); Zhaoqi Peng, Beijing (CN); Xin Guo, Beijing (CN); Yuming Liu, Beijing (CN); Min Zhu, Beijing (CN); Wei Ren, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,403

(22) Filed: Aug. 16, 2023

(65) Prior Publication Data

US 2023/0387983 A1 Nov. 30, 2023

Related U.S. Application Data

(63) Continuation of application No. 18/147,057, filed on Dec. 28, 2022, now abandoned, which is a (Continued)

(30) Foreign Application Priority Data

Mar. 15, 2018 (CN) .......................... 201810214849.7

(51) Int. Cl.
 *H04B 7/06* (2006.01)
 *H04B 1/44* (2006.01)
 (Continued)

(52) U.S. Cl.
 CPC ............. *H04B 7/0617* (2013.01); *H04B 1/44* (2013.01); *H04B 7/0695* (2013.01); *H04B 7/088* (2013.01);
 (Continued)

(58) Field of Classification Search
 CPC ...... H04B 7/0617; H04B 1/44; H04B 7/0695; H04B 7/088; H04B 7/063; H04B 1/40;
 (Continued)

(56) References Cited

U.S. PATENT DOCUMENTS 10,396,914 B2 8/2019 Nagaraja et al.
11,134,492 B2 9/2021 Guo et al.
(Continued)

FOREIGN PATENT DOCUMENTS

CN 105979476 A 9/2016
CN 106559120 A 4/2017
(Continued)

OTHER PUBLICATIONS

International Search Report and Written Opinion mailed on May 30, 2019 for PCT/CN2019/077581 filed on Mar. 11, 2019, 9 pages including English Translation of the International Search Report.

*Primary Examiner* — Kabir A Timory
(74) *Attorney, Agent, or Firm* — XSENSUS LLP

(57) ABSTRACT

The present disclosure relates to an electronic device, a wireless communication method and a computer-readable medium. According to one embodiment, an electronic device for wireless communication comprises a processing circuit, wherein the processing circuit is configured to conduct control so as to send a reference signal for a direct link to the other user equipment or to receive same from the other user equipment; the processing circuit is also configured to conduct control so as to carry out beamforming-based direct link communication with the other user equipment; and at
(Continued)

least one of a sending beam and a receiving beam for direct link communication is determined based on the measurement of the reference signal.

16 Claims, 23 Drawing Sheets

Related U.S. Application Data continuation of application No. 17/674,853, filed on Feb. 18, 2022, now abandoned, which is a continuation of application No. 16/764,883, filed as application No. PCT/CN2019/077581 on Mar. 11, 2019, now Pat. No. 11,456,789.

(51) Int. Cl.
- *H04B 7/08* (2006.01)
- *H04L 5/00* (2006.01)
- *H04L 25/02* (2006.01)
- *H04W 72/20* (2023.01)

(52) U.S. Cl.
CPC ........ *H04L 5/0048* (2013.01); *H04L 25/0224* (2013.01); *H04W 72/20* (2023.01)

(58) Field of Classification Search
CPC .. H04L 5/0048; H04L 25/0224; H04W 72/20; H04W 72/04; H04W 76/14
See application file for complete search history.

(56) References Cited

U.S. PATENT DOCUMENTS

| | | |
|---|---|---|
| 2017/0212206 A1 | 7/2017 | Kim et al. |
| 2018/0092027 A1 | 3/2018 | Sheng |
| 2018/0115358 A1 | 4/2018 | Raghavan et al. |
| 2018/0205483 A1* | 7/2018 | Nagaraja ............... H04B 7/0632 |
| 2018/0278310 A1 | 9/2018 | Lee et al. |
| 2018/0351611 A1 | 12/2018 | Nagaraja et al. |
| 2019/0123803 A1 | 4/2019 | Raghavan et al. |
| 2020/0021337 A1* | 1/2020 | Wang .................... H04J 11/0026 |
| 2020/0314828 A1 | 10/2020 | Schubert et al. |

FOREIGN PATENT DOCUMENTS

| | | |
|---|---|---|
| CN | 106576354 A | 4/2017 |
| CN | 106686620 A | 5/2017 |
| CN | 107370534 A | 11/2017 |
| CN | 107645355 A | 1/2018 |
| CN | 107769826 A | 3/2018 |
| EP | 3468054 A1 | 4/2019 |

* cited by examiner

ELECTRONIC DEVICE, WIRELESS COMMUNICATION METHOD AND COMPUTER-READABLE MEDIUM

CROSS-REFERENCE TO RELATED APPLICATIONS

This application is a continuation of U.S. application Ser. No. 18/147,057, filed Dec. 28, 2022, which a continuation of U.S. application Ser. No. 17/674,853, filed Feb. 18, 2022, which is a continuation of U.S. application Ser. No. 16/764,883, filed May 18, 2020 (now U.S. Pat. No. 11,456,789), which is based on PCT filing PCT/CN2019/077581, filed Mar. 11, 2019, which claims priority to CN 201810214849.7, filed Mar. 15, 2018, the entire contents of each are incorporated herein by reference.

TECHNICAL FIELD

The present disclosure in general relates to the technical field of wireless communication, and in particular to an electronic device for wireless communication, a wireless communication method, and a computer-readable medium.

BACKGROUND

Communication with a high frequency band (for example, a frequency band greater than 6 GHz) may result in a large path loss and a large phase noise, thus a beamforming process is required.

Different from an omnidirectional reception communication, in the beamforming-based communication, it is required to select a transmission (Tx) beam or a reception (Rx) beam. In addition, beam alignment can be performed to further improve the signal-to-noise ratio and avoid interference.

SUMMARY

Brief summary of the present disclosure is given hereinafter, so as to provide basic understanding in some aspects of the present disclosure. However, it is to be understood that this summary is not an exhaustive overview of the present disclosure. It is neither intended to identify key or critical parts of the present disclosure, nor intended to define the scope of the present disclosure. It merely functions to present some concepts of the present disclosure in a simplified form to be used as a prelude to a more detailed description stated later.

According to an embodiment, an electronic device for wireless communication is provided, which includes processing circuitry. The processing circuitry is configured to perform control to transmit to or receive from another user equipment a reference signal for a sidelink. The processing circuitry is also configured to perform control to perform beamforming-based sidelink communication with the another user equipment. At least one of a transmission beam and a reception beam for the sidelink communication is determined based on a measurement with respect to the reference signal.

According to another embodiment, a wireless communication method is provided. The method includes a step of transmitting to or receiving from another user equipment a reference signal for a sidelink. The method also includes a step of performing beamforming-based sidelink communication with the another user equipment. At least one of a transmission beam and a reception beam for the sidelink communication is determined based on measurement with respect to the reference signal.

According to still another embodiment, an electronic device for wireless communication is provided, which includes a processing circuitry. The processing circuitry is configured to allocate a communication resource for transmitting a reference signal. The reference signal is used for determining at least one of a transmission beam and a reception beam for beamforming-based sidelink communication between user equipments.

According to still another embodiment, a wireless communication method is provided, which includes a step of allocating a communication resource for transmitting a reference signal. The reference signal is used for determining at least one of a transmission beam and a reception beam for beamforming-based sidelink communication between user equipments.

According to an embodiment of the present disclosure, a computer-readable medium is further provided. The computer-readable medium includes executable instructions that, when executed by an information processing apparatus, cause the information processing apparatus to implement the method according to the above embodiments.

With the embodiments of the present disclosure, the reliability and stability of the beamforming-based sidelink communication can be improved.

BRIEF DESCRIPTION OF THE DRAWINGS

The present disclosure can be understood better with reference to the detail description given in conjunction with the drawings in the following. The same or similar element is indicated by the same or similar reference numeral throughout all the drawings. The drawings together with the following detailed description are incorporated into and form a part of the specification and serve to further illustrate the preferred embodiments of the present disclosure and to explain the principles and advantages of the present disclosure by way of example. In the drawings.

DETAILED DESCRIPTION

Figure 1:
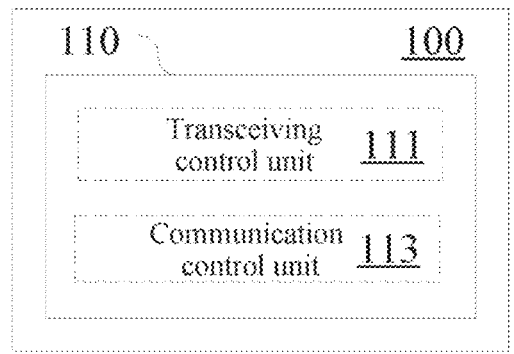
FIG. 1 is a block diagram showing a configuration example of an electronic device at a user equipment side according to an embodiment of the present disclosure.

Embodiments of the present disclosure will be described below with reference to the drawings. Elements and features described in one drawing or one embodiment of the present disclosure may be combined with elements and features in one or more other drawings or embodiments. It should be noted that, for the purpose of clarity, representations and descriptions of components and processes not related to the present disclosure and known to those skilled in the art are omitted in the drawings and the description.

As shown in FIG. 1, an electronic device 100 at a user equipment side according to an embodiment includes a processing circuitry 110. The processing circuitry 110 may be implemented, for example, by a specific chip, a chipset, a central processing unit (CPU), or the like.

According to an embodiment, the user equipment may include a vehicle. Although a vehicle may be used as an example of the user equipment in the following description of the example embodiment, the present disclosure is not limited thereto, but may be used in various application scenarios of a new radio (NR) sidelink, such as a machine type communication (MTC), device-to-device (D2D) communication, vehicle-to-device (V2X) communication, internet of things (IOT) communication, and the like. The V2X communication may include vehicle-to-vehicle (V2V) communication, vehicle-to-pedestrian (V2P) communication, vehicle-to-infrastructure (V2I) communication, and the like.

The processing circuitry 110 includes a transceiving control unit 111 and a communication control unit 113. It should be noted that, although the transceiving control unit 111 and the communication control unit 113 are shown in the form of functional blocks in the drawing, it will be appreciated that the functions of these units may also be implemented by the processing circuitry 110 as a whole, which is not necessarily implemented by discrete actual components in the processing circuitry 110. In addition, although the processing circuitry 110 is shown by a block in the drawing, the electronic device 100 may include multiple processing circuitries, and the functions of the transceiving control unit 111 and the communication control unit 113 may be distributed into the multiple processing circuitries, such that these functions can be performed by cooperation of the multiple processing circuitries.

The transceiving control unit 111 is configured to perform control to transmit to or receive from another user equipment a reference signal for a sidelink.

The communication control unit 113 is configured to perform control to perform beamforming-based sidelink communication with the another user equipment. At least one of a transmission beam and a reception beam for the sidelink communication is determined based on a measurement with respect to the above reference signal.

In the sidelink communication, two resource allocation modes are mainly adopted, namely, a base station scheduling mode (Mode 3), and a user equipment (UE) autonomous selection mode (Mode 4). Next, a triggering mode of the beamforming-based sidelink communication is briefly described in combination with different resource allocation modes.

In the case of the Mode 3, the beamforming-based sidelink communication may be determined by a base station such as gNB, or may be determined by a transmitter. In the case of the Mode 4, the beamforming-based sidelink communication may be determined by a transmitter or a receiver.

More specifically, triggering conditions of the beamforming-based sidelink communication may include, for example, the following that service requirements (such as a delay, a data rate, a bandwidth, or a priority) request the communication to be performed in a frequency band, for example greater than 6 GHz, however, the communication range or communication quality (such as a path loss and an estimated signal-to-noise ratio (SNR)) in the high frequency band cannot meet the service requirements.

In addition, if a UE, such as a vehicle, is configured by a base station to perform communication in a high frequency band by using the beamforming technology or a chip of the UE is pre-configured to perform communication in a high frequency band by using the beamforming technology, the beamforming-based sidelink communication may be performed.

Next, the reference signal for the sidelink is described. According to an embodiment, a sidelink reference signal dedicated to beam management which is also referred to herein as SL-BMRS may be set. In addition, when the UE is located within the coverage of the base station, a sounding reference signal (SRS) may be multiplexed as a beam measurement reference signal for the sidelink. In addition, in a case that one of the transmitter and the receiver is used for synchronization reference, a sidelink synchronization signal (SLSS) may be used as a beam measurement reference signal.

Accordingly, according to an embodiment, the reference signal for the sidelink includes a sounding reference signal, a sidelink synchronization signal, or a sidelink beam management reference signal SL-BMRS.

Next, an example mode of multiplexing SRS or SLSS as a beam measurement reference signal will be described.

In the example mode of multiplexing SRS, when a vehicle is within the coverage of a base station, a set of subframe numbers available to transmit SRS in a cell is configured through a system information block SIB 2 (for example, through a srs-SubframeConfig field of SoundingRS-UL-ConfigCommon). In addition, each vehicle may be configured with a specific SRS resource set by a high layer through the parameter SRS-ResourceSetConfig. In each resource set, the high layer may configure a number K of SRS resources for the vehicle through the parameter SRS-ResourceConfig, where K is equal to or greater than one, and a maximum value of K may be indicated by SRS_capability. When the SRS may be multiplexed as a sidelink beam measurement reference signal, the high layer may set the parameter SRS-SetUse to "SL-BeamManagement". In this case, in each SRS resource set, there is only one SRS resource to be transmitted at the same time. When beam scanning is performed with respect to multiple beams, SRS resources in different SRS resource sets may be transmitted simultaneously.

In the example mode of multiplexing SLSS, in a Mode 4 scenario, when a transmitter or a receiver is a synchronous reference vehicle, the SLSS may be used for beam measurement, but a priority of the SLSS may be set to be lower than that of the SL-BMRS, and the beam measurement configuration mode may be the same as that of the SL-BMRS.

In addition, according to an embodiment, the transceiving control unit 111 is configured to perform control to transmit, on multiple beams, multiple reference signals which respectively corresponds to the multiple beams to the another user equipment. For example, the information may be transmitted or received through a Physical Sidelink Control Channel (PSCCH).

Specifically, the reference signal SL-BMRS is unique to each vehicle, and each beam may have its own beam ID, corresponding SL-BMRS, and a resource position occupied by the SL-BMRS. If a receiver needs to measure a transmission beam, the receiver may first configure measurement information of each beam, which includes a type of the beam measurement reference signal, an ID of an identification beam, a time-frequency resource position corresponding to a measurement reference signal SL-BMRS, and the like.

Accordingly, according to an embodiment, the transceiving control unit 111 is configured to perform control to transmit to or receive from another user equipment a type (SL-BMRS/SLSS/SRS) of the reference signal, a time-frequency resource position of the reference signal, a beam identification corresponding to the reference signal, and the like.

Table 1 shows an example of measurement information of a beam.

TABLE 1

| | Configuration | | | |
|---|---|---|---|---|
| SL RS #k | RS index (SL-BMRS/SLSS/SRS) | Frequency position | Time position | Beam ID (K) |

Figure 15:
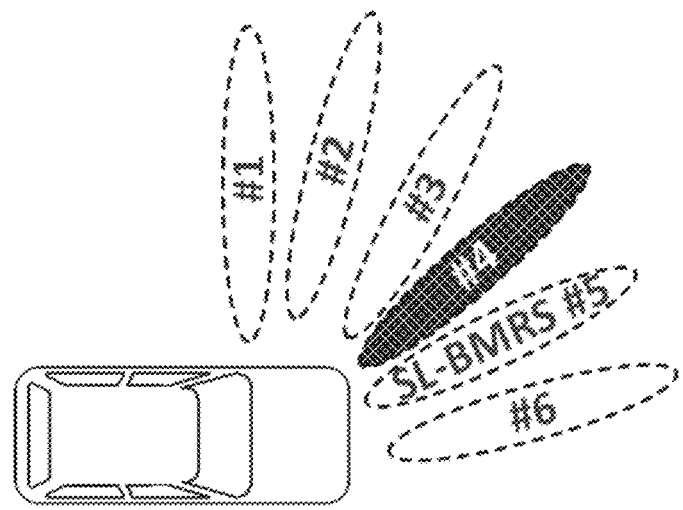
FIG. 15 is a schematic diagram showing an example of a beam configuration.

FIG. 15 shows an example of a beam configuration, where each beam has its own identification and may be individually configured with a reference signal.

In addition, according to an embodiment, position-based beamforming may be adopted in a sidelink. Accordingly, the transceiving control unit 111 may be configured to perform control to acquire position information of the another user equipment and/or provide position information of a current user equipment to the another user equipment. The determination of at least one of the transmission beam and the reception beam for the sidelink communication is further based on the position information. For example, the position information may include, but is not limited to, latitude, longitude, orientation, and speed. In addition, in an embodiment, the determination of at least one of the transmission beam and the reception beam for the sidelink communication may be only based on the position information, and not based on the reference signal for the sidelink described in the above embodiment. In other words, the embodiment in which the determination of the beam is based on the position information and the embodiment in which the determination of the beam is based on the reference signal may be combined with each other, or may be implemented independently. For example, in a case of performing beam determination based on position information, by directly exchanging position information between the transmitter and the receiver, the transmitter may select a transmission beam based on the position information of the receiver, and the receiver may also select a reception beam based on the position information of the transmitter.

Taking the V2X application scenario as an example, the position information may include orientation, latitude, longitude, and speed of a vehicle. The vehicle may acquire its own position information through positioning technologies such as the Global Positioning System (GPS), and transmit the position information to a communication object through a sidelink or the network (for example, via gNB or a roadside unit (RSU)).

For example, in a Mode 4 scenario, a vehicle may periodically broadcast its position information and vehicle identification to the surroundings, so that vehicles on both sides of the communication can each transmit position information and vehicle identification on the broadcast channel.

Accordingly, according to an embodiment, the transceiving control unit 111 may be configured to perform control to broadcast position information of a current user equipment and/or receive broadcasted position information of the another user equipment.

In a Mode 3 scenario, in addition to receiving broadcasted position information, when requesting for a sidelink resource from a base station, the vehicle may also request for acquiring the position information of the receiver.

Figure 16:
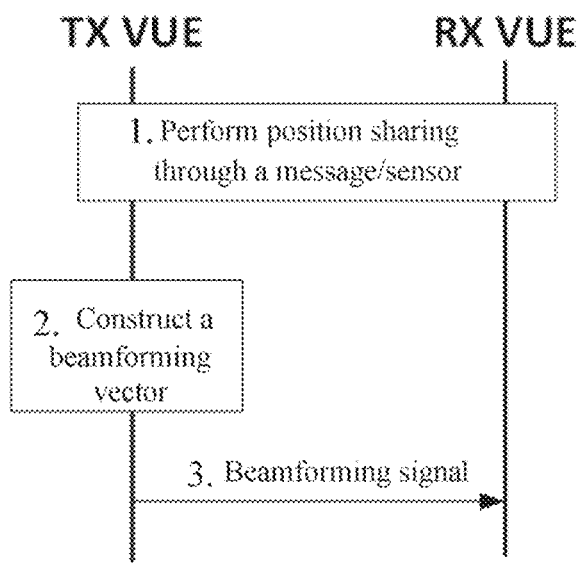
FIG. 16 is a signaling flowchart for illustrating an example process of position-based beamforming.

FIG. 16 shows an example process of position-based beamforming. First, the transmitter and the receiver perform position sharing. Then, the transmitter may perform beamforming based on the position information, and transmit a beamforming signal to the receiver.

Figure 2:
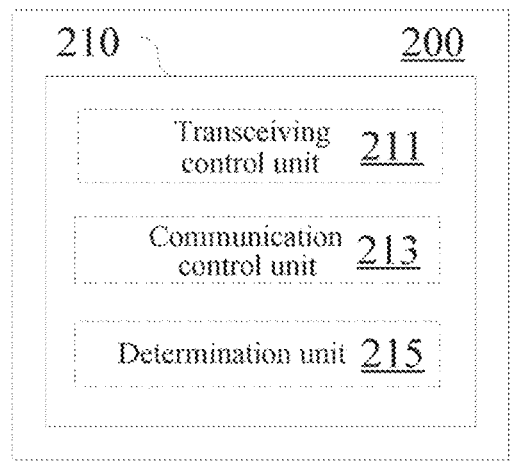
FIG. 2 is a block diagram showing a configuration example of an electronic device at a user equipment side according to another embodiment.

In addition, beam management may be performed in different modes. As shown in FIG. 2, according to an embodiment, the electronic device 200 at the user equipment side includes a processing circuitry 210. The processing circuitry 210 includes a transceiving control unit 211, a communication control unit 213, and a determination unit 215. Configurations of the transceiving control unit 211 and the communication control unit 213 are respectively similar to that of the transceiving control unit 111 and the communication control unit 113 described above with reference to FIG. 1.

The determination unit 215 is configured to determine a beam management mode for the sidelink communication.

For example, the beam management mode may include: a first mode in which both the transmission beam and the reception beam are determined based on the measurement with respect to the reference signal; and a second mode in which only one of the transmission beam and the reception beam is determined based on the measurement with respect to the reference signal.

The communication control unit 213 is configured to perform control to perform the sidelink communication with the another user equipment based on the determined beam management mode.

According to an embodiment, the determination unit 215 may determine the beam management mode based on stability of the sidelink.

In the following description of the example embodiment, the first mode may also be referred to as a "feedback-based beam management mode", and the second mode may also be referred to as a "feedback-free beam management mode".

Still taking the V2X application scenario as an example, for example, the feedback-free beam management mode may be adopted in the following conditions:

driving routes of vehicles are the same and a relative position and a relative speed are stable;

the transmitter records a communication beam pair link (BPL) condition with the receiver in a previous predetermined period of time, when a ratio (which may be defined as a parameter A) of beams with better quality (for example, the reference signal received power (RSRP) is greater than a predetermined threshold) is greater than a certain threshold, the transmitter determines that the transmission path with the receiver is good (for example, there is no obstruction and there is a small interference between them), then the feedback-free beam management may be performed; or the vehicle is performing other service with a higher priority, and cannot transmit or receive feedback.

In addition, the transceiving control unit 211 may be further configured to perform control to transmit indication information related to a beam management mode to another user equipment.

Figure 17:
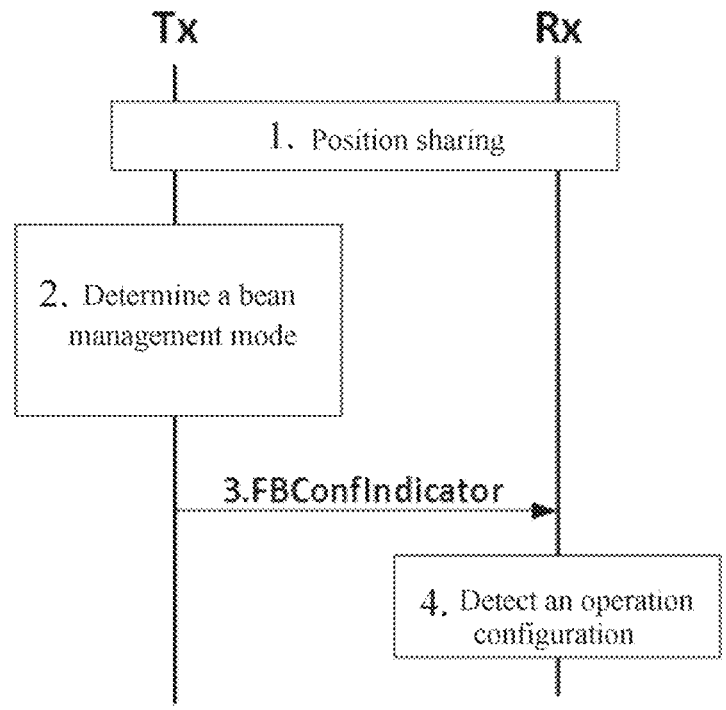
FIG. 17 is a signaling flowchart for illustrating an example process of determining and configuring a beam management mode.

FIG. 17 shows an example process for determining and configuring a beam management mode.

As shown in FIG. 17, first, the transmitter and the receiver perform position sharing. It should be noted that this step is optional. For example, in a case of determining a beam management mode based on a condition that is not related to position information in the above conditions, position sharing is not required.

Next, the transmitter determines the beam management mode. However, the present disclosure is not limited thereto, and the beam management mode may also be determined by the receiver or determined by the network side (for example, gNB or RSU).

Then, the transmitter transmits indication information (FBConfIndicator) of the beam management mode to the receiver, so that the receiver can detect its operation configuration according to the indication information.

For example, the indication information may include two bits of information. Table 2 shows an example of the meaning of the indication information.

TABLE 2

| Configuration indication (FBConfIndicator) | | |
|---|---|---|
| 00 | 01 | 11 |
| Support feedback | No feedback is transmitted during the bean determination and tracking processes | No feedback is transmitted during the bean determination, tracking and failure recovery processes |

Next, an example mode of configuring related parameters and resources for beam measurement is described.

According to an embodiment, the reference signal for sidelink is transmitted using a resource allocated by the base station. For example, the resource may be allocated through radio resource control (RRC) signaling.

Figure 18:
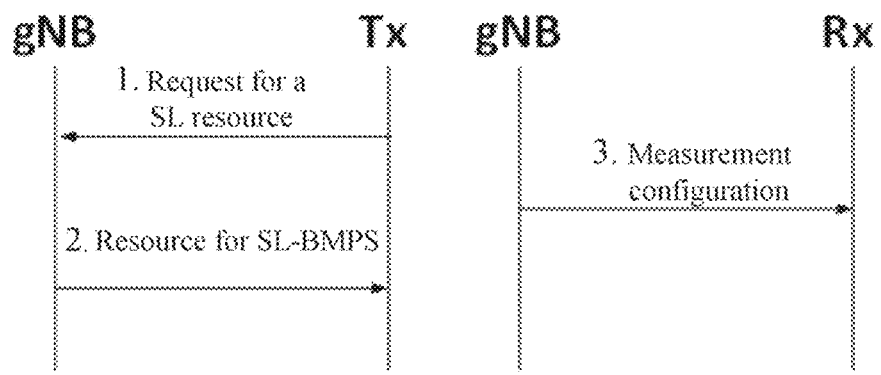
FIGS. 18 to 20 are signaling flowcharts for illustrating example processes of configuring related parameters and resources for beam measurement.

FIG. 18 shows an example process for a measurement configuration in a case of Mode 3.

As shown in FIG. 18, in step 1, the transmitter requests for a sidelink resource from the base station. Next, in step 2, the base station may allocate resources for SL-BMRS/SRS through RRC signaling, and notify the transmitter of the time-frequency resource position information.

In addition, in step 3, the base station may configure, through RRC signaling, the receiver to perform beam measurement, to determine an optimal transmission beam. The configuration content may include, for example, a type of a beam measurement reference signal of the transmission beam, a time-frequency resource position of the beam measurement reference signal, and a correspondence between the beam measurement reference signal and the beam ID. In addition, if beam management is based on feedback, the measurement result reporting step may also be configured, for example, the time-frequency resource required for reporting the measurement result in the PSCCH channel on the frequency band of less than 6 GHz can be configured.

Accordingly, for a receiver, that is, in a case that the transceiving control unit 111 is configured to perform control to receive a reference signal for a sidelink from another user equipment, according to an embodiment, the transceiving control unit 111 may also be configured to perform control to receive the following information transmitted by the base station: a type of the reference signal, a time-frequency resource position of the reference signal, and a beam identification corresponding to the reference signal.

Figure 19:
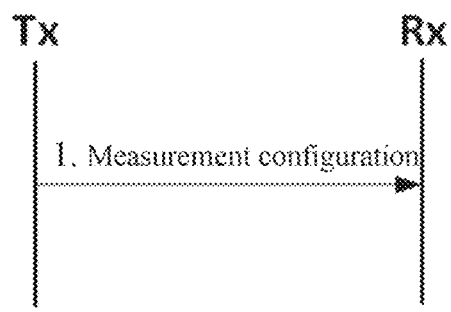
Figure 20:
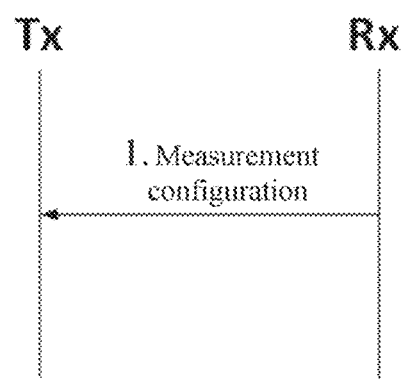

FIGS. 19 and 20 show example processes of a measurement configuration in a case of Mode 4. FIG. 19 corresponds to a case where the transmitter transmits a beam measurement reference signal for beam determination, and FIG. 20 corresponds to a case where the receiver transmits a beam measurement reference signal for beam determination.

As shown in FIG. 19, for example, the transmitter configures beam measurement information on the PSCCH (<6 GHz) for the receiver through dedicated signaling, which may include a type (SL-BMRS/SLSS) of the measurement reference signal, a resource position occupied by the beam measurement reference signal and the corresponding beam ID. If a feedback-based beam management mode is adopted, the measurement result reporting step may be further configured, that is, when the report is performed after the measurement.

As shown in FIG. 20, for example, the receiver configures beam measurement information on the PSCCH (<6 GHz) for the transmitter through dedicated signaling, which may include a type (SL-BMRS/SLSS) of the measurement reference signal, a resource position occupied by the beam measurement reference signal and the corresponding beam ID. If a feedback-based beam management mode is adopted, the measurement result reporting step may be further configured, that is, when the report is performed after the measurement.

Next, an example mode of a beam determination process is described. The configuration of the electronic device according to the example embodiment will be described with reference to FIG. 2 again.

As shown in FIG. 2, according to an embodiment, the electronic device 200 at the user equipment side includes a processing circuitry 210. The processing circuitry 210 includes a transceiving control unit 211, a communication control unit 213, and a determination unit 215. Configuration of the communication control unit 213 is similar to that of the communication control unit 113 described above with reference to FIG. 1.

The transceiving control unit 211 is configured to perform control to transmit the reference signal to the another user equipment. In other words, this embodiment corresponds to the user equipment of the transmitter.

In addition, the transceiving control unit 211 is further configured to perform control to receive feedback information transmitted by the another user equipment based on the measurement with respect to the reference signal.

The determination unit 215 is configured to determine a transmission beam for the sidelink communication based on the feedback information.

Figure 21:
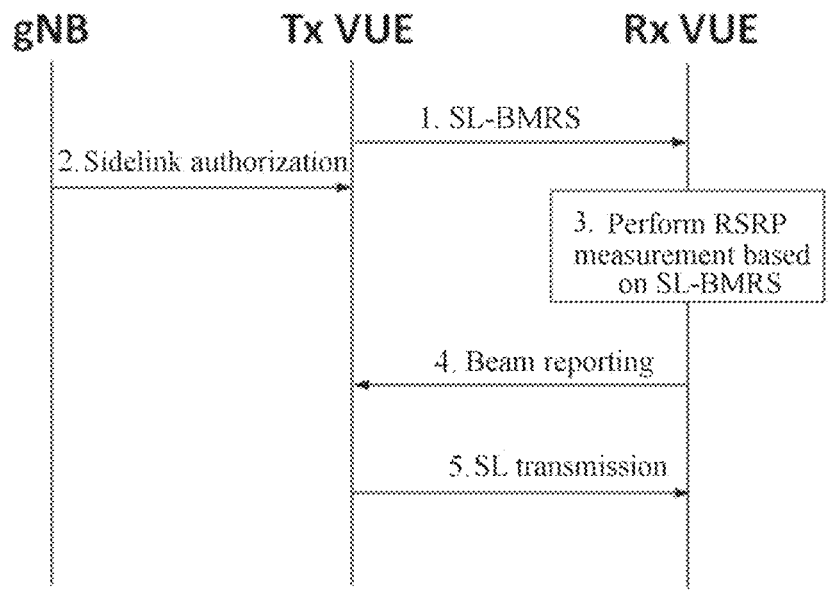
FIGS. 21 to 26 are signaling flowcharts for illustrating example processes of beam determination.

FIG. 21 shows an example process for feedback-based beam determination in a case of Mode 3.

As shown in FIG. 21, the transmitter transmits the sidelink reference signal to the receiver. In addition, the base station performs sidelink authorization for the transmitter.

After the configuration of the base station, the receiver measures the reference signal corresponding to the transmission beam, and reports the measurement result (such as RSRP) and the corresponding beam ID of each beam to the transmitter. Therefore, the transmitter may determine the transmission beam according to the feedback information of the receiver, and perform sidelink transmission.

Figure 24:
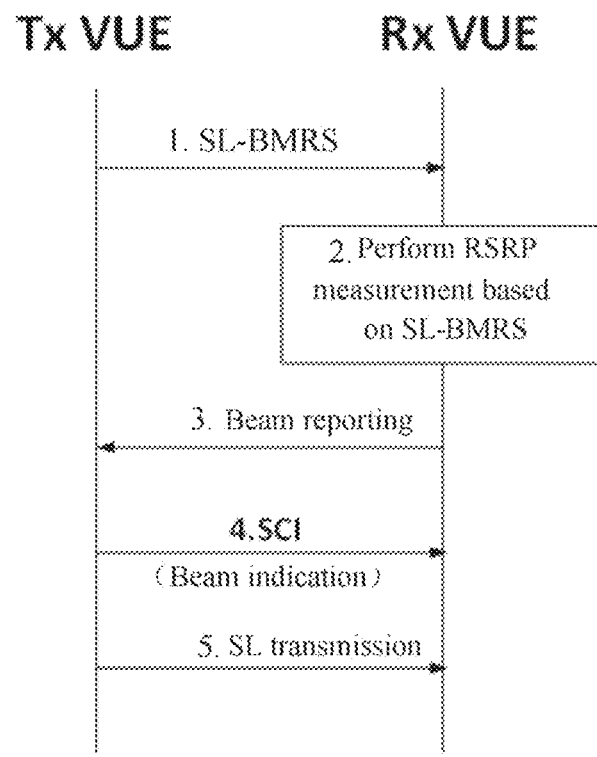

In addition, FIG. 24 shows an example process for feedback-based beam determination in a case of Mode 4.

As shown in FIG. 24, in step 1, the transmitter selects a resource for transmitting a beam measurement reference signal from a pre-configured resource pool (for example, by a base station). When the transmitter is used as a synchronization reference, SLSS may be transmitted as a beam measurement reference signal for beam determination.

In step 2, the receiver measures the reference signal.

In step 3, the receiver reports the measurement result RSRP and the corresponding beam ID of each beam to the transmitter in the pre-configured PSCCH (for example, <6 GHz) resource pool (for example, by the base station).

In step 4, the transmitter transmits a beam indication to the receiver on the PSCCH (<6 GHz), the content of which includes the ID of the transmission beam which is selected according to the beam measurement result reported by the receiver. In addition, the sidelink control information (SCI) associated with data transmission may be transmitted to the receiver (for example, through a frequency band of greater than 6 GHz) to indicate transmission information.

Accordingly, according to an embodiment, the transceiving control unit 211 may be further configured to perform control to notify the another user equipment (the receiver) of the transmission beam determined by the determination unit 215.

Next, an example embodiment in the feedback-free beam management mode will be described.

Figure 22:
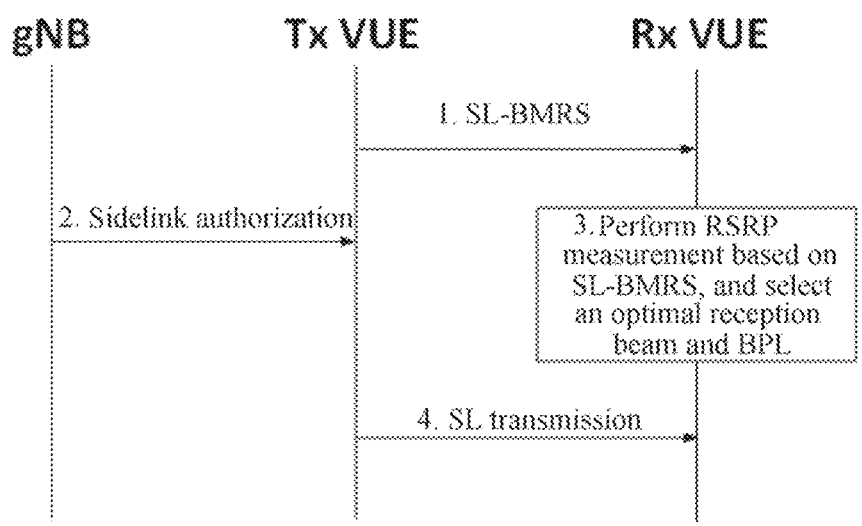

FIG. 22 shows an example process for feedback-free beam determination in a case of Mode 3.

Figure 23:
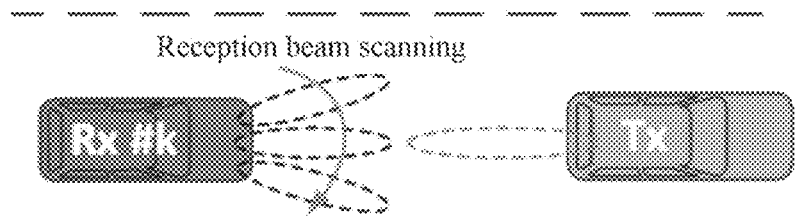

Different from the example process shown in FIG. 21, as shown in FIG. 22, after the configuration of the base station, the receiver performs RSRP measurement on the transmission beam and performs beam scanning on the reception beam (as shown in FIG. 23). The optimal reception beam is selected, to form an optimal beam pair link with the transmission beam.

Figure 3:
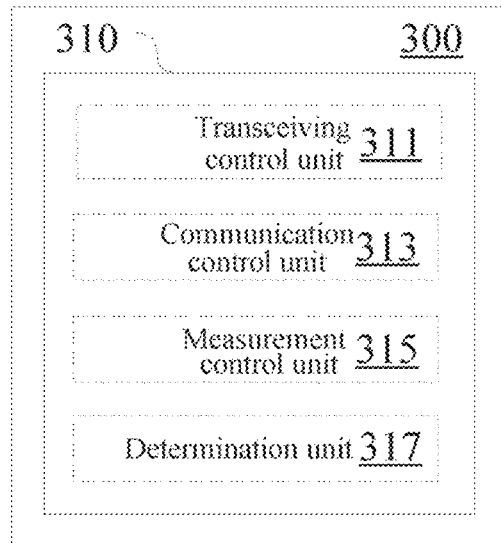
FIG. 3 is a block diagram showing a configuration example of an electronic device at a user equipment side according to still another embodiment.

In addition, the embodiment of the present disclosure also includes an electronic device at the user equipment side corresponding to the receiver side. As shown in FIG. 3, an electronic device 300 according to the embodiment includes a processing circuitry 310. The processing circuitry 310 includes a transceiving control unit 311, a communication control unit 313, a measurement control unit 315, and a determination unit 317. The communication control unit 313 is similar to the communication control unit 113 described in the above embodiment.

The transceiving control unit 311 is configured to perform control to receive a reference signal for a sidelink from another user equipment (a transmitter).

The measurement control unit 315 is configured to perform control to measure the reference signal.

The determination unit 317 is configured to determine a reception beam for a beamforming-based sidelink based on a measurement with respect to the reference signal.

It should be noted that the embodiment is not limited to the above feedback-based beam management mode or the feedback-free beam management mode. In other words, regardless of whether the receiver feeds back the measurement result on the reference signal to the transmitter, the receiver can determine the reception beam based on the measurement with respect to the reference signal.

In addition, in an embodiment, in a case where the feedback-free beam management mode is adopted, the determination of the reception beam may be only based on position information, and not based on the reference signal for a sidelink. For example, the receiver may select the reception beam based on the position information of the transmitter.

Corresponding to the feedback-based beam management mode, according to an embodiment, the transceiving control unit 311 may be further configured to transmit feedback information to the another user equipment (the transmitter) based on the measurement with respect to the reference signal.

In addition, in a case that the feedback-free beam management mode is adopted, the transmitter may determine a transmission beam for the sidelink communication based on the position information of the another user equipment (the receiver), and may transmit the reference signal for the sidelink on the determined transmission beam.

Figure 25:
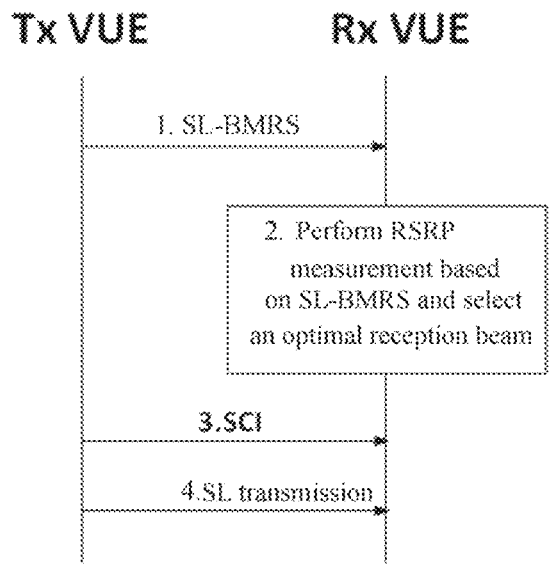
Figure 26:
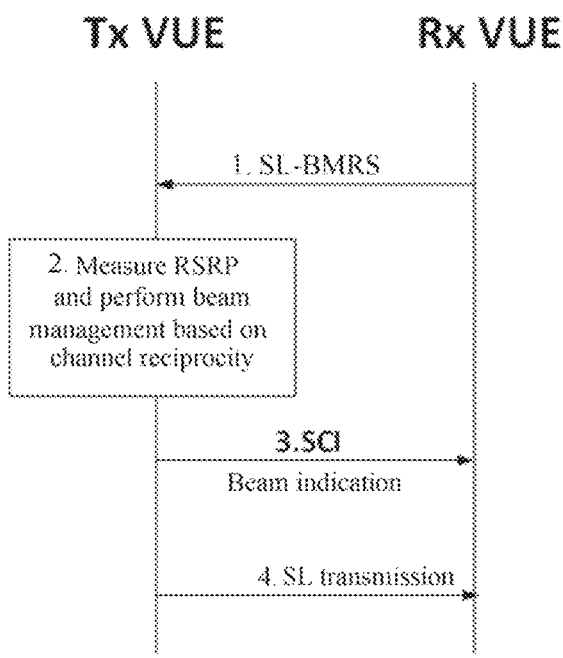

FIG. 25 and FIG. 26 show example processes of performing beam determination by using a feedback-free beam management mode in the case of Mode 4. FIG. 25 corresponds to a case where the transmitter is used as a synchronization reference, and FIG. 26 corresponds to a case where the receiver is used as a synchronization reference.

As shown in FIG. 25, when the transmitter is a synchronous reference, in step 1, the transmitter may transmit SLSS as a beam measurement reference signal. In step 2, the receiver selects a reception beam based on the measurement with respect to the reference signal. In step 3, the transmitter transmits the SCI to the receiver, and in step 4, a sidelink transmission is performed.

As shown in FIG. 26, when the receiver is a synchronous reference, in step 1, the receiver may transmit SLSS to the transmitter as a beam measurement reference signal, which may be transmitted using resources in a resource pool pre-configured by the base station, for example.

In step 2, after receiving the SLSS transmitted by the receiver, the transmitter may perform SLSS-based RSRP measurement, perform the transmission beam scanning and utilize channel reciprocity, so as to select an optimal beam pair link.

In step 3, the transmitter may transmit SCI to the receiver to indicate information of data transmission, and may transmit beam indication signal to indicate a beam ID of the reception beam.

In step 4, the transmitter and the receiver perform sidelink transmission using the corresponding beam.

After the beam determination is performed in the above example mode and the sidelink transmission is performed based on the determined beam, a beam tracking process may further be performed.

Specifically, the receiver may measure and monitor each beam pair link between the transmitter and the receiver, that is, the transmitter may periodically transmit reference signals for beam measurement on all the transmission beams (which may include the transmission beams selected for transmission), to perform beam tracking.

Figure 27:
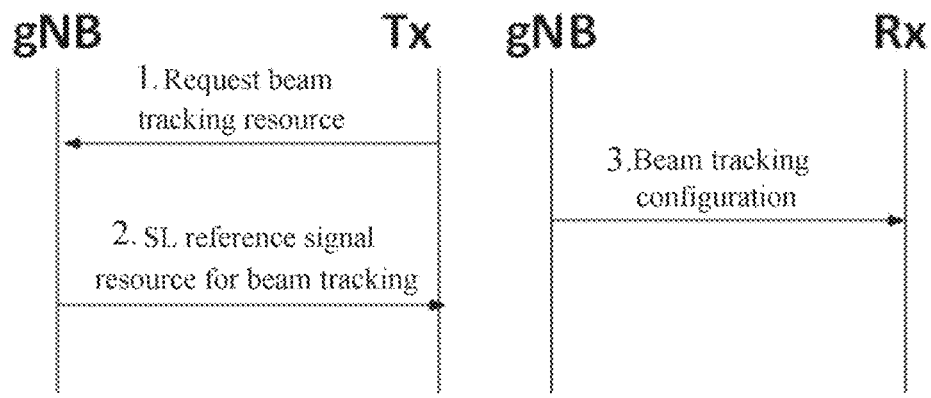
FIGS. 27 to 30 are signaling flowcharts for illustrating example processes of beam tracking.
Figure 28:
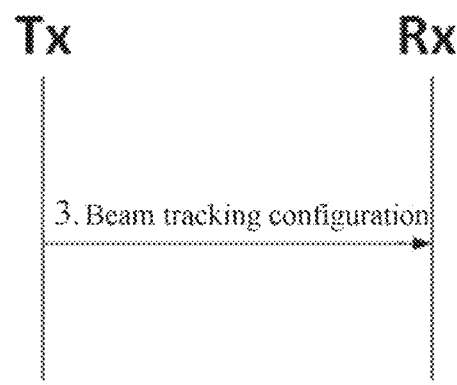

In Mode 3, the receiver may be configured by the base station, for example, through RRC signaling. An example process is as shown in FIG. 27. In Mode 4, the receiver may be configured by the transmitter on the resources in the pre-configured resource pool through dedicated control signaling. An example process is as shown in FIG. 28.

The beam tracking configuration transmitted by the base station or by the transmitter to the receiver may include, for example, the content listed in Table 3 below.

TABLE 3

| Configuration | |
|---|---|
| Reference signal indication | Periodically transmitted SL-BMRS/SLSS/SRS |
| Beam ID | Measurement results of which beams are to be reported |
| Time interval between reference signal and reporting | When is the measurement result to be reported by the receiver |
| Period (periodic/semi-static reporting) | Frequency for reporting the measurement result |
| Trigger event (non-periodic reporting) | Metrics in the domain can be RSRP, receiver timing, or the like |

Figure 29:
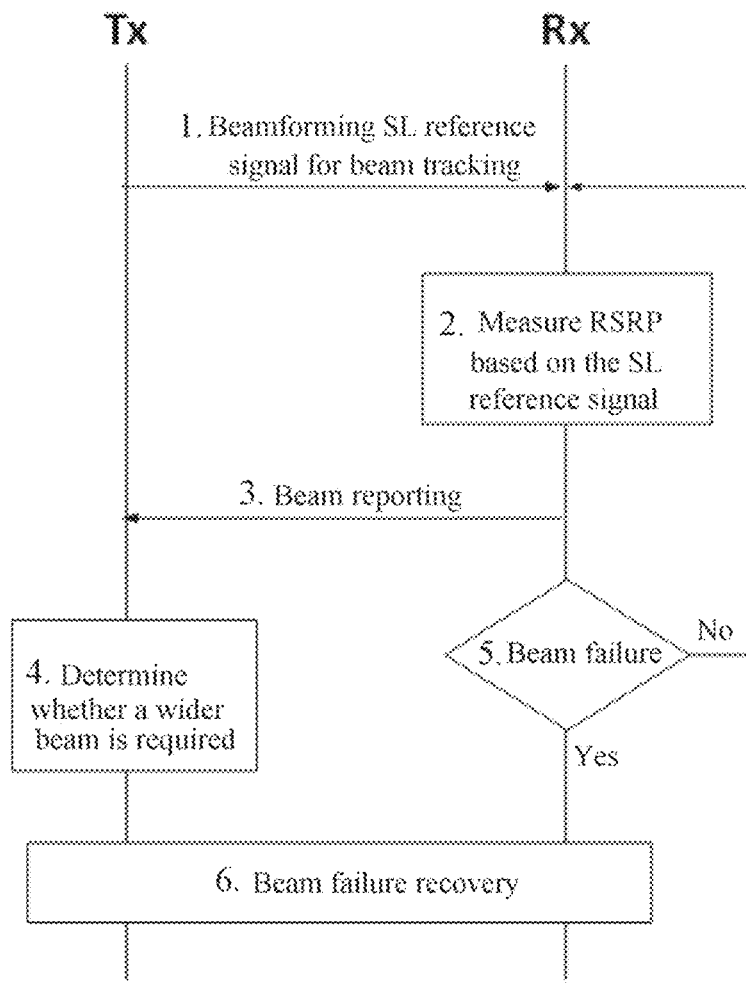

FIG. 29 shows an example process for feedback-based beam tracking.

In step 1, the transmitter periodically transmits a measurement reference signal of each possible transmit beam (which may be determined, for example, by a geographical position) on the (pre-configured) configured resources by the base station, to perform beam tracking.

In step 2, the receiver measures the reference signal, and feeds back the beam report to the transmitter in step 3.

In step 4, after receiving the measurement result, the transmitter, for example, determines whether to perform beam adjustment according to fluctuation/distribution state of the measurement result (which is related to a beam failure threshold). For example, if quality of the beam pair link fluctuates frequently near a threshold, it is required to adjust the beam to be wider, such that the beam is easier to track.

In step 5, the receiver determines whether a beam failure occurs. Trigger conditions for the beam failure may include, for example:

1. RSRP based on the measurement reference signal is less than $Th_{RSRP}$ during the beam tracking process;
2. the duration of condition 1 is greater than $Th_{Time}$ (this threshold may be different depending on delay requirements of different services).

In a case of a beam failure, a beam recovery process may be performed in step 6.

Taking the V2X application as an example, reasons and triggering conditions of the sidelink beam failure may, for example, include: uneven beams caused by high-speed mobility of vehicles; excessive changes in relative positions of vehicles; insertion of a new vehicle between vehicles; line-of-sight is changed to non-line-of-sight between the transmitter and the receiver; resource conflicts occur in a resource pool corresponding to the beam; and the like. For different triggering reasons, different beam failure schemes may be adopted. For example, for a case where a new vehicle is inserted, the newly inserted vehicle may be used as a relay without changing the beam direction. For the case where the line-of-sight is changed to non-line-of-sight, a surrounding vehicle may be used as a relay or a roadside equipment may be used as a relay, to assist the communication.

Figure 30:
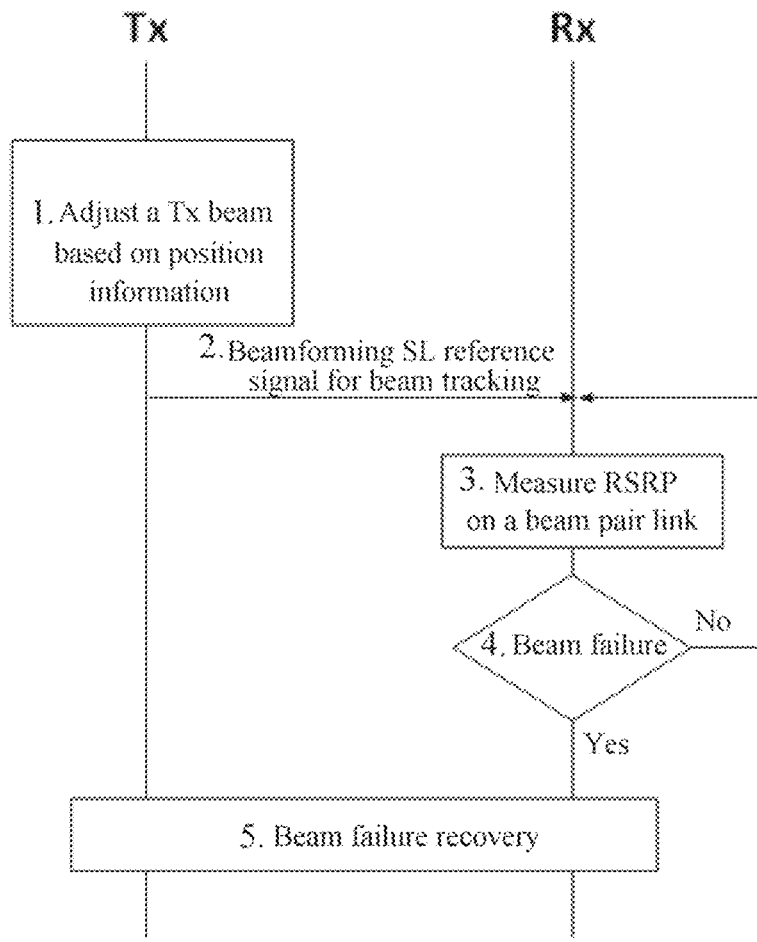

FIG. 30 shows an example process for feedback-free beam tracking.

In step 1, the transmitter adjusts the transmission beam according to the position information during transmission.

In step 2, the transmitter periodically transmits a measurement reference signal of each possible transmit beam (which is determined by a geographical position) on the (pre-configured) configured resources by the base station, to perform beam tracking.

In step 3, the receiver measures the reference signal.

In step 4, the receiver determines whether a beam failure occurs.

In the case of a beam failure, a beam recovery process may be performed in step 5.

Figure 4:
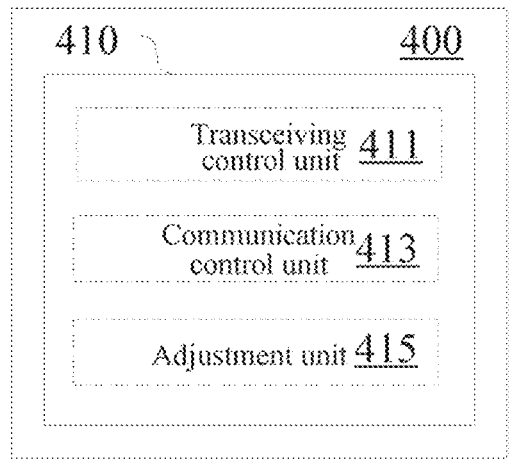
FIG. 4 is a block diagram showing a configuration example of an electronic device at a user equipment side according to still another embodiment.

Next, a configuration of an electronic device of the example embodiment related to beam tracking is described. As shown in FIG. 4, an electronic device 400 according to the embodiment includes a processing circuitry 410. The processing circuitry 410 includes a transceiving control unit 411 and a communication control unit 413, which are similar to the transceiving control unit 111 and the communication control unit 113 described in the above embodiment.

In addition, in order to perform beam tracking, the transceiving control unit 411 is further configured to perform control to periodically transmit, on multiple beams, multiple reference signals which correspond to the multiple beams to another user equipment.

According to an embodiment, the processing circuitry 410 may further include an adjustment unit 415. The transceiving control unit 411 is further configured to perform control to receive feedback information of the another user equipment with respect to the periodically transmitted reference signal. The adjustment unit 415 is configured to perform beam adjustment based on the feedback information. For example, the beam adjustment may include increasing a beam width.

Figure 5:
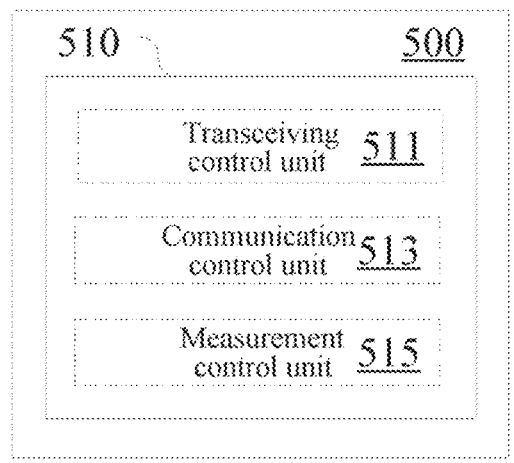
FIG. 5 is a block diagram showing a configuration example of an electronic device at a user equipment side according to still another embodiment.

FIG. 5 shows a configuration of an electronic device of the example embodiment related to beam tracking which corresponds to a receiver. As shown in FIG. 5, an electronic device 500 according to the embodiment includes a processing circuitry 510. The processing circuitry 510 includes a transceiving control unit 511, a communication control unit 513, and a measurement control unit 515. Configurations of the transceiving control unit 511 and the communication control unit 513 are similar to that of the corresponding units described above.

The measurement control unit 515 is configured to perform control to perform measurement with respect to multiple reference signals which are periodically transmitted by the another user equipment (the transmitter) on multiple beams and which respectively correspond to the multiple beams.

Next, an example mode of the beam recovery process is described.

Figure 31:
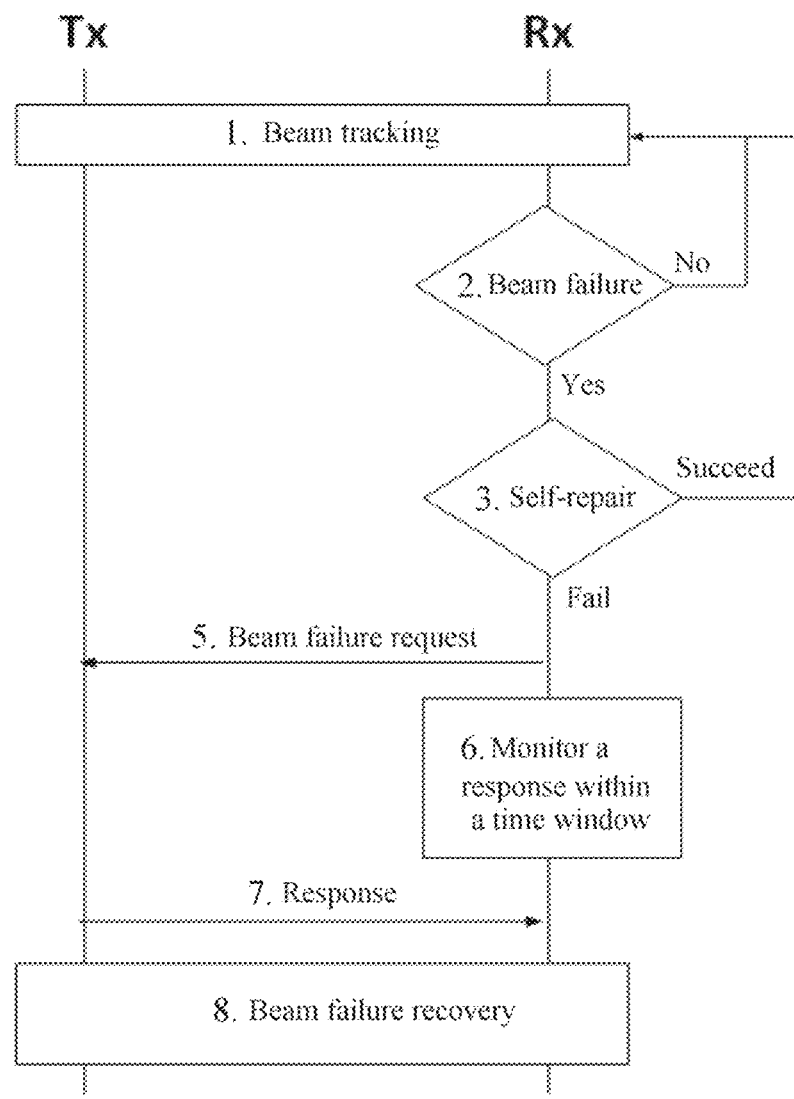
FIGS. 31 to 35 are signaling flowcharts for illustrating a beam recovery mechanism.

FIG. 31 shows an example process for feedback-based beam failure recovery.

In step 1, the transmitter and receiver perform beam tracking.

In a case that the receiver determines that a beam failure occurs (Yes in step 2), in step 3, the receiver may first enter a self-repair process, that is, the receiver may rescan all the reception beams. If there is an available reception beam, the receiver will select this reception beam to form a new beam pair link; if all the reception beams are unavailable, the receiver transmits a request to the transmitter (step 5) for beam recovery.

The resources for the receiver to report the beam failure request and the transmitter to respond may be PSCCH resources (<6 GHz). In Mode 3, the resources may be configured by the base station through RRC signaling. In Mode 4, the vehicle may autonomously select resources in the pre-configured resource pool to transmit the beam failure recovery request and the response.

In step 6, after transmitting the failure recovery request, the receiver may monitor the response of transmitter. If no response is monitored within a monitoring window (which may be pre-configured and may be related to service time delay requirements), the receiver may retransmit the request. When the number of times for transmitting the request exceeds a threshold (which may be pre-configured and may be related to the service time delay requirements), the receiver may stop monitoring, abandon this communication, and search for another communication object.

In step 7, the transmitter may explicitly or implicitly notify the receiver of the beam failure recovery mechanism it has selected in the failure recovery response, and a basis of selection and a manner of notification may be configured by RRC signaling, for example.

In step 8, the beam failure recovery is performed continually. For example, a new set of candidate beams may be set, and beam scanning and determination processes and the like can be performed.

Figure 32:
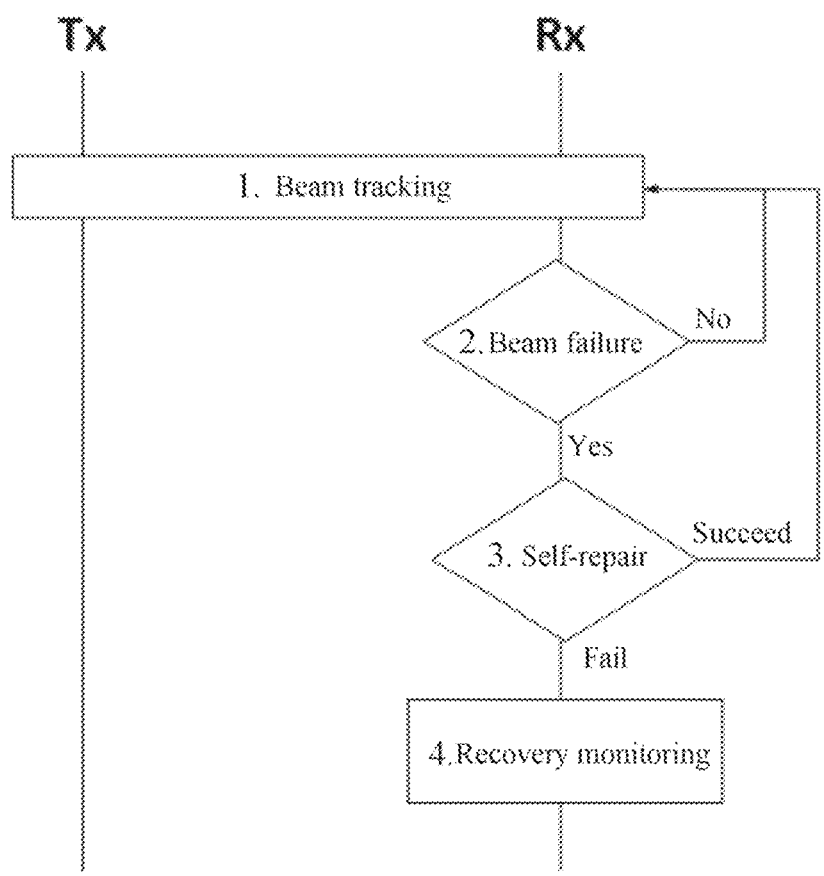

FIG. 32 shows an example process for feedback-free beam failure recovery.

Similar to the example process shown in FIG. 31, after detecting a beam failure, the receiver first enters the self-repair process in step 3, that is, the receiver will rescan all the reception beams. If there is an available reception beam, the receiver will select this reception beam to form a new beam pair link; if all the reception beams are unavailable, the self-repair process fails.

In step 4, the failed transmission beam is monitored continuously, when a monitoring period of time exceeds a time threshold (which is determined by service time delay requirements), this communication is abandoned, and another communication object may be searched.

Next, a configuration example of an embodiment of an electronic device related to beam recovery is described. Referring back to FIG. 4, the electronic device 400 according to the embodiment includes a processing circuitry 410. The processing circuitry 410 includes a transceiving control unit 411 and a communication control unit 413, which are similar to the transceiving control unit 111 and the communication control unit 113 described in the above embodiment.

The transceiving control unit 411 is further configured to perform control to receive indication information indicating a link failure transmitted by the another user equipment (the receiver).

In addition, the processing circuitry 410 may further include an adjustment unit 415 configured to adjust a beam set or a beam width for transmitting a reference signal in response to the indication information.

Figure 6:
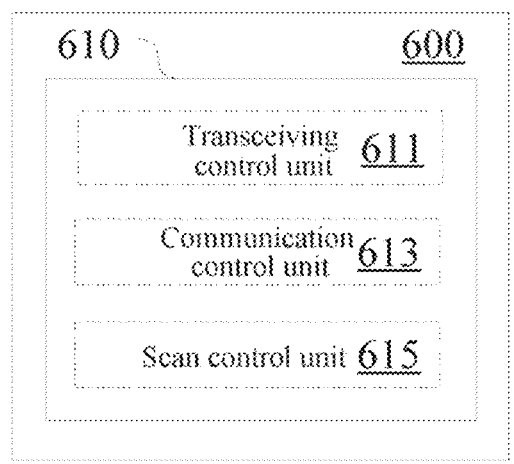
FIG. 6 is a block diagram showing a configuration example of an electronic device at a user equipment side according to still another embodiment.

Next, a configuration example of an embodiment of an electronic device related to beam recovery that corresponds to a receiver is described. As shown in FIG. 6, the electronic device 600 according to the embodiment includes a processing circuitry 610. The processing circuitry 610 includes a transceiving control unit 611, a communication control unit 613, and a scan control unit 615. Configuration of the transceiving control unit 611 and the communication control unit 613 are similar to that of the corresponding units described above.

The scan control unit 615 is configured to perform control to perform reception beam scanning in a case where sidelink communication through a current reception beam fails.

According to an embodiment, the transceiving control unit 611 is further configured to perform control to transmit indication information indicating a link failure to the another user equipment (the transmitter), in a case where the reception beam scanning fails.

In addition, the transceiving control unit 611 may be further configured to perform control to monitor response information of the another user equipment (the transmitter) within a predetermined period of time, after transmitting the indication information.

Example embodiments related to beam recovery are described above. In addition, in some embodiments, a recovery mode for the sidelink communication may be determined based on service requirements. The recovery mode may include, for example, a reselect-request recovery mode, a multi-beam mode, and a beam widening mode. The service requirements may include, for example, a reliability requirement and a time delay sensitivity requirement.

As an example, services may be classified according to QoS (Quality of Service), which may correspond to, for example, PPPP (pass-through packet priority). The transmitter may select an appropriate beam failure recovery mechanism according to a range of the PPPP and inform the receiver of the beam failure recovery mechanism.

Table 4 below lists several non-security-related services and specific requirements.

TABLE 4

| Usage codes | 3 | 6 | 10 | 11 | 12 | 13 | 16(1)/16(2) |
|---|---|---|---|---|---|---|---|
| Time delay | 10 ms | 100 ms | 100 ms | 100 ms | 20 ms | 20 ms | 50 ms/ 10 ms |
| Realiablity | 90% | 99% | high | high | high | high | 90%/ 99.99% |
| Bandwidth | high | — | — | — | — | — | — |

TABLE 4-continued

| Usage codes | 3 | 6 | 10 | 11 | 12 | 13 | 16(1)/16(2) |
|---|---|---|---|---|---|---|---|
| Data rate/size | large (25 Mbp) | 1600 byte (5-10 Hz) | 6500 byte | 53 Mbp | 2.75 Mbp 6500 byte | 65 Mbps | 10 Mbps/ 700 Mbps |
| Range/x second* (maximum relative speed) [m/s]) | high (250 m) | City 50 m County 500 m High-speed road 1000 m | 10 seconds | 5 seconds | 10 seconds | 5 seconds | 100 m/ 500 m |

According to the reliability and delay requirements of services, the services may be divided into three types (the corresponding services are indicated by the usage codes in the above table): high reliability and insensitive to time delay (6, 10, 11); low reliability and sensitive to time delay (3, 12, 13, 16 (1)); high reliability and insensitive to time delay (16 (2)).

For different types of services, a reselect-request recovery mechanism, a multi-beam mechanism, and a beam widening mechanism may be applied, respectively.

In an actual scenario, the transmitter may select a recovery mechanism based on service requirements. First, QoS may correspond to a specific range of PPPP. The actual value of the PPPP is 0 to 8. The services may be divided into, for example, three levels based on the size of the PPPP, and the transmitter may directly select an appropriate beam failure recovery mechanism according to the known PPPP. The correspondence is as shown in Table 5 below.

TABLE 5

| PPPP | Usage codes | Failure recovery mechanism |
|---|---|---|
| 0-3 | 3, 12, 13, 16(1) | Multi-beam mechanism and beam widening mechanism |
| 4-6 | 6, 10, 11 | Reselect-request recovery mechanism |
| 7 | 16(2) | Other techniques are required |

It should be noted that the values of the PPPP given in Table 5 are only examples. The actual value of the PPPP depends on a specific implementation of an operator and a manufacturer.

Figure 33:
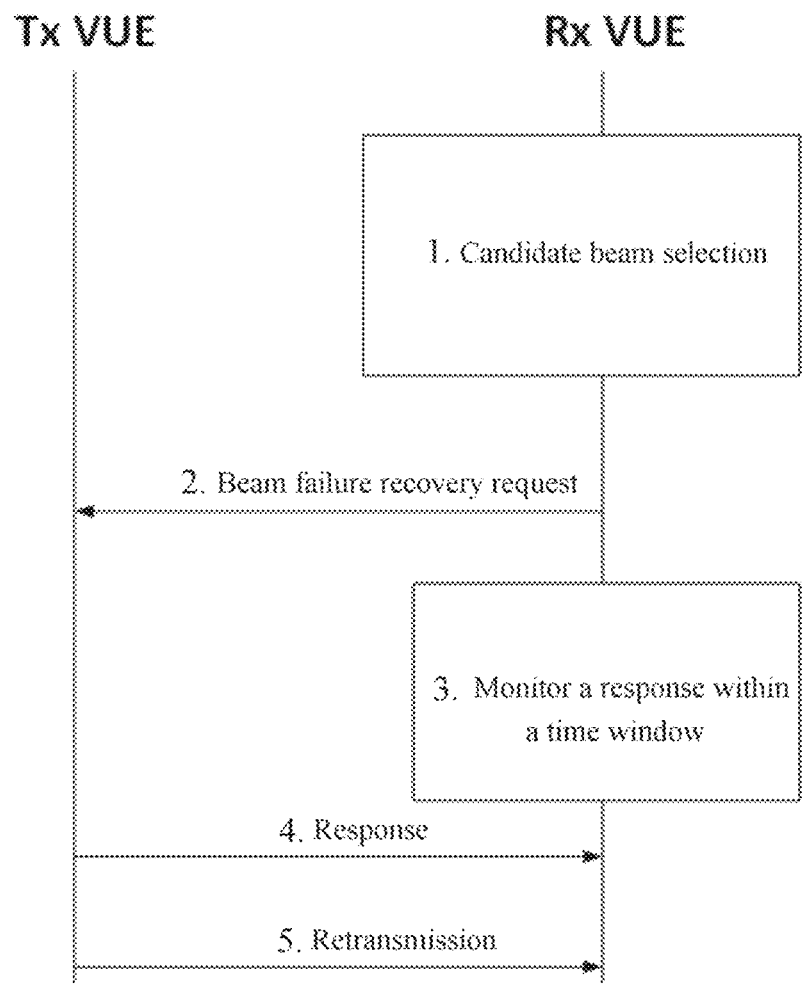
Figure 34:
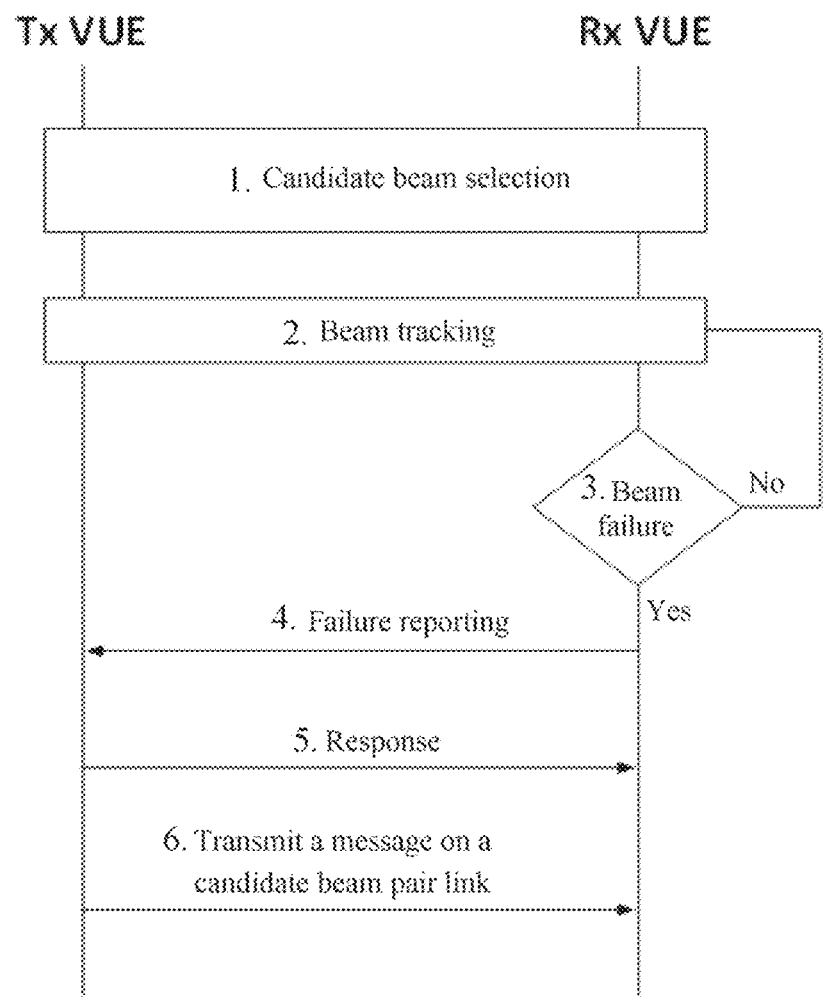
Figure 35:
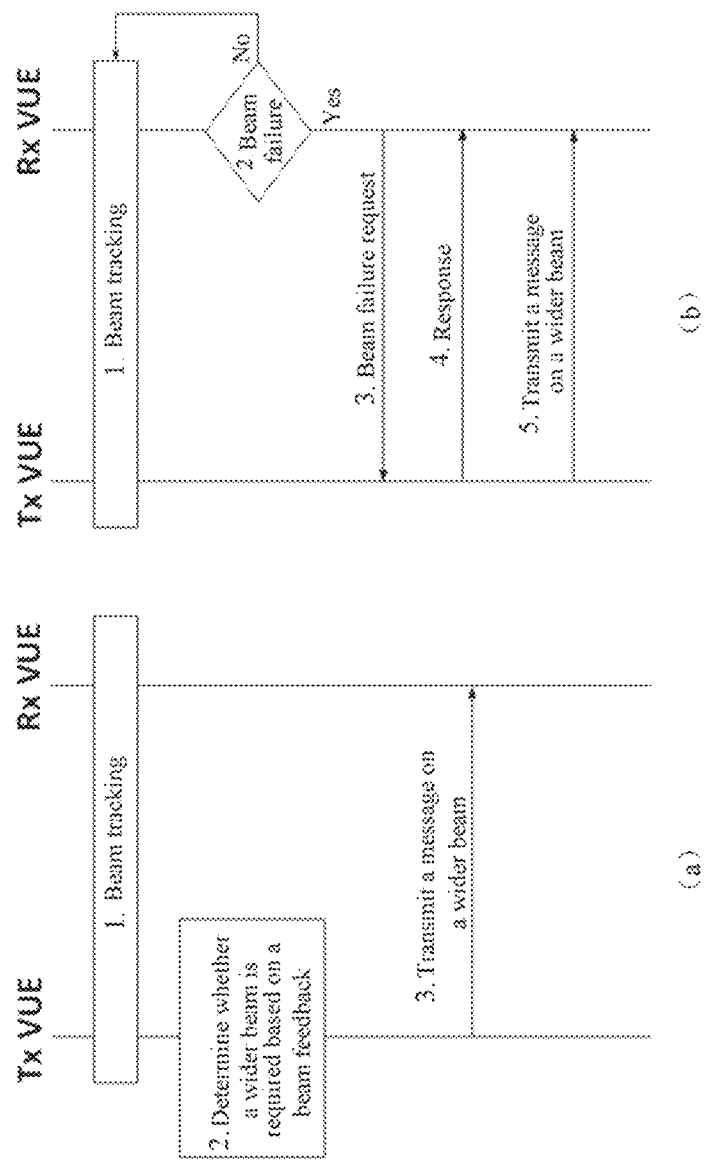

FIGS. 33 to 35 show example processes for a reselect-request recovery mechanism, a multi-beam mechanism, and a beam widening mechanism triggered by a receiver, respectively.

As shown in FIG. 33, in step 1, after monitoring a beam failure, the receiver may measure and scan all the transmission beams again based on the periodic beam reference signal to select a new available candidate beam. In step 2, the receiver transmits a recovery request to the transmitter, which may include an ID of the candidate beam. In step 3, the receiver monitors a response of the transmitter within a predetermined time window. In step 4, the transmitter transmits a response, which may include a beam ID for retransmission and a SCI corresponding to a retransmission message. In step 5, the retransmission is performed.

As shown in FIG. 34, in step 1, in the beam determination process, instead of determining only one beam pair link for transmission, the transmitter and the receiver may select a candidate beam set, and measure and update the candidate beam set during a beam tracking process. Next, processes of beam tracking, measurement and reporting are performed in steps 2 to 4. In step 5, after receiving a failure report, the transmitter may use the most recently updated candidate beam set for transmission, and may transmit the corresponding beam ID and the SCI corresponding to the retransmission information to the receiver in the failure response message. In step 6, a message is transmitted on the candidate beam pair link.

The multi-beam mechanism may be triggered by the receiver after the beam failure. Alternatively, multiple candidate beam pair links may be used for transmission simultaneously by the transmitter after the beams are determined in consideration of improving the reliability or reducing interaction time delay caused after the beam failure.

FIG. 35 shows an example process for a beam widening mechanism, in which (a) corresponds to a case of triggering by a transmitter, and (b) corresponds to a case of triggering by a receiver.

In the case of triggering by the transmitter, as shown in (a) of FIG. 35, beam tracking is performed in step 1, and in step 2, the transmitter determines whether a wider beam is required, and in step 3, a wider beam is used to transmit a message when necessary.

In the case of triggering by the receiver, as shown in (b) of FIG. 35, beam tracking is performed in step 1, and in step 2, the receiver determines that the beam fails, and failure request and response are performed in step 3 and step 4. In step 5, a wider beam is used to transmit a message when necessary.

In addition, beam failure recovery may also be performed in combination with other technologies when necessary, such as carrier aggregation (widening bandwidth) or enhanced hybrid automatic repeat request (HARQ) mechanism based on a channel busy rate (CBR)/channel quality.

It should also be noted that the above example embodiment of determining a recovery mode for sidelink communication based on service requirements may be applied to feedback-based beam management and feedback-free beam management.

In the above description of the electronic device according to the embodiments of the present disclosure, it is apparent that some processes and methods are also disclosed. Next, a description of a method according to an embodiment of the present disclosure is given without repeating the details that have been described above.

Figure 7:
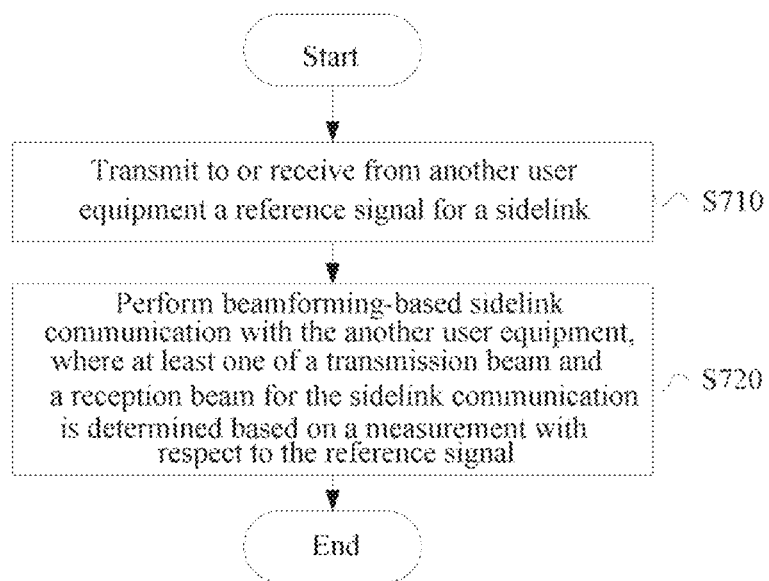
FIG. 7 is a flowchart showing a process example of a wireless communication method at a user equipment side according to an embodiment of the present disclosure.

As shown in FIG. 7, a wireless communication method at a user equipment side according to an embodiment includes the following steps S710 and S720.

In S710, a reference signal for a sidelink is transmitted to or received from another user equipment.

In S720, beamforming-based sidelink communication is performed with the another user equipment. At least one of a transmission beam and a reception beam for the sidelink communication is determined based on the measurement with respect to the above reference signal.

In addition, the embodiments of the present disclosure further include a device and method at a base station side. Next, a description of the embodiment for the base station side will be given without repeating the details corresponding to the above embodiments.

Figure 8:
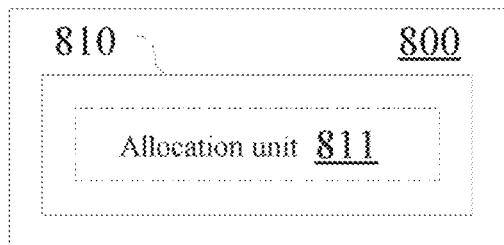
FIG. 8 is a block diagram showing a configuration example of an electronic device at a base station side according to an embodiment of the present disclosure.

As shown in FIG. 8, according to an embodiment, an electronic device 800 at a base station side includes a processing circuitry 810. The processing circuitry 810 includes an allocation unit 811 configured to allocate a communication resource for transmitting a reference signal. The reference signal is used for determining at least one of a transmission beam and a reception beam for beamforming-based sidelink communication between user equipments.

Figure 9:
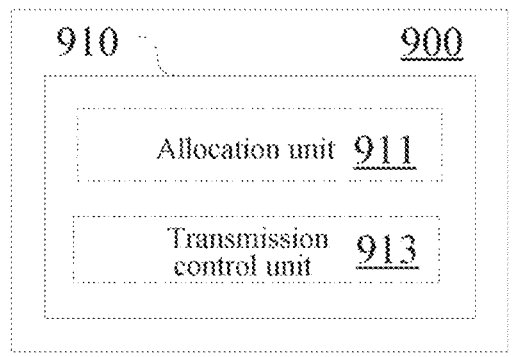
FIG. 9 is a block diagram showing a configuration example of an electronic device at a base station side according to another embodiment.

As shown in FIG. 9, according to another embodiment, an electronic device 900 at a base station side includes a processing circuitry 910. The processing circuitry 910 includes an allocation unit 911 (a configuration of which is similar to that of the above allocation unit 811) and a transmission control unit 913.

The transmission control unit 913 is configured to perform control to transmit at least one of the following information to one of the user equipments: a type of the reference signal; a time-frequency resource position of the reference signal; and a beam identification corresponding to the reference signal.

Figure 10:
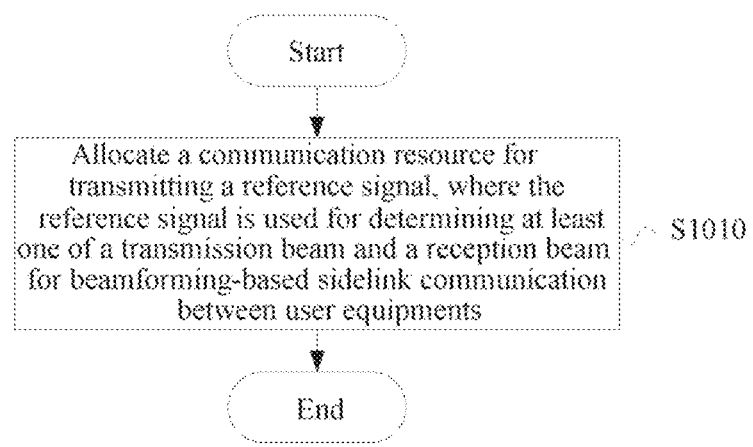
FIG. 10 is a flowchart showing a process example of a wireless communication method at a base station side according to an embodiment of the present disclosure.

FIG. 10 shows a wireless communication method at a base station side according to an embodiment, which includes a step of allocating a communication resource for transmitting a reference signal. The reference signal is used for determining at least one of a transmission beam and a reception beam for beamforming-based sidelink communication between user equipments.

An embodiment of the present disclosure further includes a wireless communication apparatus (at a user equipment side or a base station side), which includes a transceiver device and an electronic device as described in the above embodiments.

In addition, an embodiment of the present disclosure further includes a computer-readable medium, which includes executable instructions that, when executed by an information processing apparatus, cause the information processing apparatus to implement the method according to the above embodiments.

An embodiment of the present disclosure further includes a wireless communication apparatus at a user equipment side and a wireless communication apparatus at a base station side. The wireless communication apparatus includes a transceiver device and a processor described in conjunction with the above embodiments.

As an example, various steps of the above methods and various modules and/or units of the above devices may be implemented by software, firmware, hardware, or a combination thereof. When implemented by software or firmware, a program constituting software for implementing the above method may be installed from a storage medium or a network to a computer (for example, a general-purpose computer 1100 shown in FIG. 11) having a dedicated hardware structure, which, when installed with various programs, can perform various functions and the like.

Figure 11:
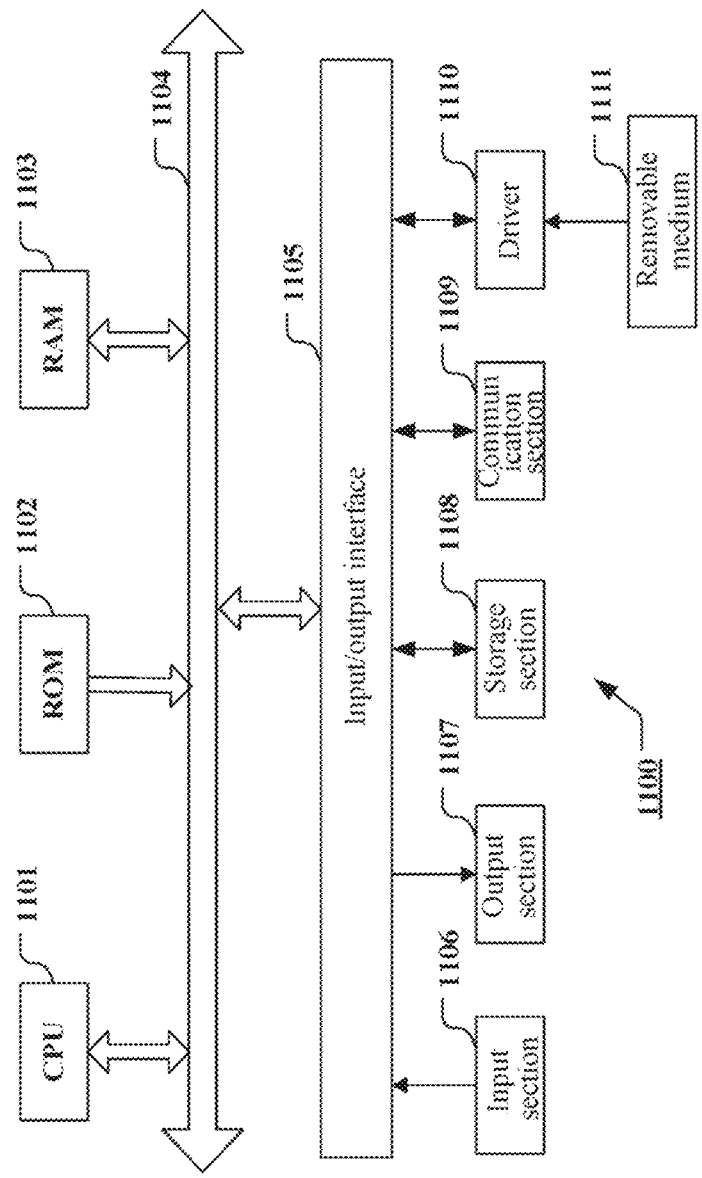
FIG. 11 is a block diagram showing an example structure of a computer that implements the method and apparatus of the present disclosure.

In FIG. 11, a central processing unit (CPU) 1101 executes various processing according to a program stored in a read-only memory (ROM) 1102 or a program loaded to a random access memory (RAM) 1103 from a memory section 1108. Data required for various processing and the like of the CPU 1101 may be stored in the RAM 1103 as needed. The CPU 1101, the ROM 1102 and the RAM 1103 are linked to each other via a bus 1104. An input/output interface 1105 is also linked to the bus 1104.

The following components are linked to the input/output interface 1105: an input section 1106 (including a keyboard, a mouse, and the like), an output section 1107 (including a display such as a cathode ray tube (CRT), a liquid crystal display (LCD) and the like, and a loudspeaker and the like), a storage section 1108 (including a hard disk and the like), and a communication section 1109 (including a network interface card such as a LAN card, a modem and the like). The communication section 1109 performs communication processing via a network such as the Internet. A driver 1110 may also be linked to the input/output interface 1105 as needed. A removable medium 1111 such as a magnetic disk, an optical disk, a magnetic optical disk, a semiconductor memory and the like may be installed onto the driver 1110 as needed, so that a computer program read therefrom is installed into the storage section 1108 as needed.

In the case where the above series of processing are implemented by software, programs forming the software are installed from a network such as the Internet or a storage medium such as the removable medium 1111.

It should be appreciated by those skilled in the art that the storage medium is not limited to the removable medium 1111 shown in FIG. 11, which has a program stored therein and is distributed separately from the device to provide the program to the user. The removable medium 1111 may be, for example, a magnetic disk (including a floppy disk (registered trademark)), an optical disk (including a compact disk read-only memory (CD-ROM) and a digital versatile disk (DVD)), a magneto-optical disk (including a mini disc (MD) (registered trademark)), and a semiconductor memory. Alternatively, the storage medium may be a ROM 1102, a hard disk included in the storage section 1108 in which programs are stored, and the like, and may be distributed to the user along with a device in which they are incorporated.

An embodiment of the present disclosure also relates to a program product storing a machine-readable instruction code. The instruction code, when being read and executed by a machine, performs the above method according to the embodiment of the present disclosure.

Accordingly, a storage medium for carrying the above program product storing the machine-readable instruction code is also included in the present disclosure. The storage medium includes, but is not limited to, a floppy disk, an optical disk, a magneto-optical disk, a memory card, a memory stick, and the like.

Embodiments of the present application also relate to the following electronic devices. In the case where the electronic device is used at the base station side, the electronic device may be implemented as any type of evolved Node B (eNB), such as a macro eNB and a small eNB. A small eNB may be an eNB covering a cell smaller than a macro cell, such as a pico eNB, a micro eNB, and a home (femto) eNB. Instead, the electronic device may be implemented as any other type of base station, such as a NodeB and a base transceiver station (BTS). Preferably, the electronic device may be implemented as a gNB in a 5G system. The electronic device may include: a main body (which is also referred to as a base station device) configured to control wireless communication; and one or more remote radio heads (RRHs) arranged at a place different from the main body. In addition, various types of terminals described below may operate as base stations by temporarily or semi-persistently performing functions of a base station.

In the case where the electronic device is used at the user equipment side, the electronic device may be implemented as a mobile terminal (such as a smartphone, a tablet personal computer (PC), a notebook PC, a portable game terminal, a portable/dongle-type mobile router, and a digital camera device) or an in-vehicle terminal (such as a car navigation device). In addition, the electronic device may be a wireless communication module (such as an integrated circuit module including a single or multiple chips) mounted on each of the terminals described above.

Application Example of a Terminal Device

Figure 12:
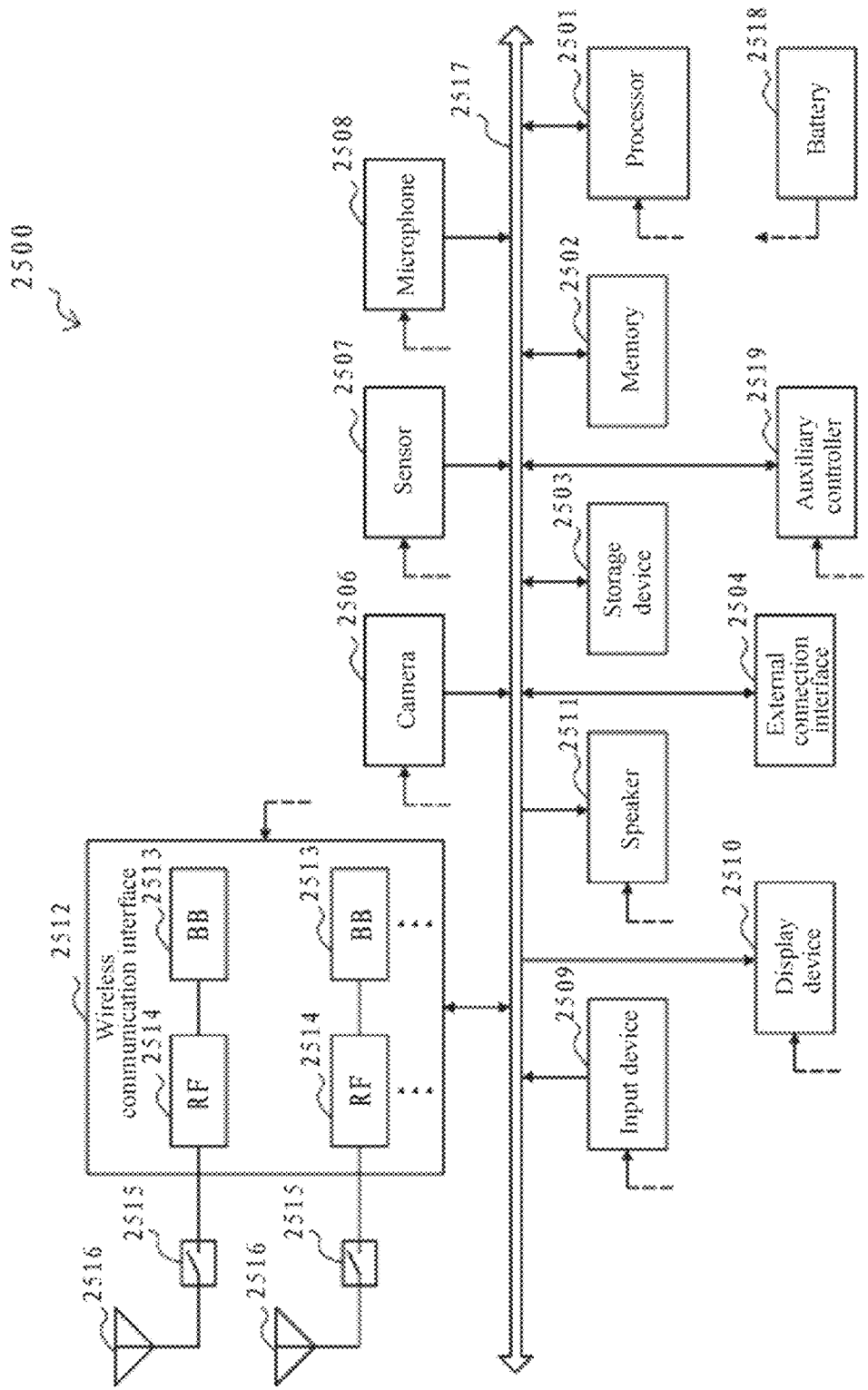
FIG. 12 is a block diagram showing an example of a schematic configuration of a smartphone to which the technology of the present disclosure may be applied.

FIG. 12 is a block diagram showing an example of a schematic configuration of a smart phone 2500 to which the technology according to the present disclosure may be applied. The smart phone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage device 2503 may include a storage medium such as a semiconductor memory and a hard disk. The external connection interface 2504 is an interface for connecting an external device (such as a memory card and a universal serial bus (USB) device) to the smart phone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 into audio signals. The input device 2509 includes, for example, a touch sensor configured to detect touch on a screen of the display device 2510, a keypad, a keyboard, a button, or a switch, and receives an operation or information inputted by a user. The display device 2510 includes a screen (such as a liquid crystal display (LCD) and an organic light-emitting diode (OLED) display), and displays an output image of the smart phone 2500. The speaker 2511 converts audio signals that are outputted from the smart phone 2500 into sounds.

The wireless communication interface 2512 supports any cellular communication scheme (such as LTE and LTE-Advanced), and performs wireless communication. The wireless communication interface 2512 may generally include, for example, a base band (BB) processor 2513 and a radio frequency (RF) circuit 2514. The BB processor 2513 may perform, for example, encoding/decoding, modulating/demodulating, and multiplexing/demultiplexing, and performs various types of signal processing for wireless communication. In addition, the RF circuit 2514 may include, for example, a frequency mixer, a filter, and an amplifier, and transmits and receives wireless signals via the antenna 2516. The wireless communication interface 2512 may be a chip module having the BB processor 2513 and the RF circuit 2514 integrated thereon. The wireless communication interface 2512 may include multiple BB processors 2513 and multiple RF circuits 2514, as shown in FIG. 12. Although FIG. 12 shows the example in which the wireless communication interface 2512 includes the multiple BB processors 2513 and the multiple RF circuits 2514, the wireless communication interface 2512 may include a single BB processor 2513 or a single RF circuit 2514.

Furthermore, in addition to a cellular communication scheme, the wireless communication interface 2512 may support another type of wireless communication scheme such as a short-distance wireless communication scheme, a near field communication scheme, and a wireless local area network (LAN) scheme. In this case, the wireless communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used by the wireless communication interface 2512 to transmit and receive wireless signals. The smart phone 2500 may include multiple antennas 2516, as shown in FIG. 12. Although FIG. 12 shows the example in which the smart phone 2500 includes multiple antennas 2516, the smart phone 2500 may include a single antenna 2516.

Furthermore, the smart phone 2500 may include the antenna 2516 for each wireless communication scheme. In this case, the antenna switches 2515 may be omitted from the configuration of the smart phone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512, and the auxiliary controller 2519 to each other. The battery 2518 supplies power to various components of the smart phone 2500 shown in FIG. 12 via feeder lines, which are partially shown as dashed lines in FIG. 12. The auxiliary controller 2519 operates a minimum necessary function of the smart phone 2500, for example, in a sleep mode.

In the smart phone 2500 shown in FIG. 12, the transceiver device of the wireless communication apparatus at the user equipment side according to the embodiment of the present disclosure may be implemented by the wireless communication interface 2512. At least a part of the functions of the processing circuitry and/or each unit of the electronic device or the wireless communication apparatus at the user equipment side according to the embodiment of the present disclosure may also be implemented by the processor 2501 or the auxiliary controller 2519. For example, the power consumption of the battery 2518 may be reduced by performing a part of the functions of the processor 2501 by the auxiliary controller 2519. In addition, the processor 2501 or the auxiliary controller 2519 may perform, by executing a program stored in the memory 2502 or the storage device 2503, at least part of the functions of the processing circuitry and/or each unit of the electronic device or the wireless communication apparatus at the user equipment side according to the embodiment of the present disclosure.

Application Example of a Base Station

Figure 13:
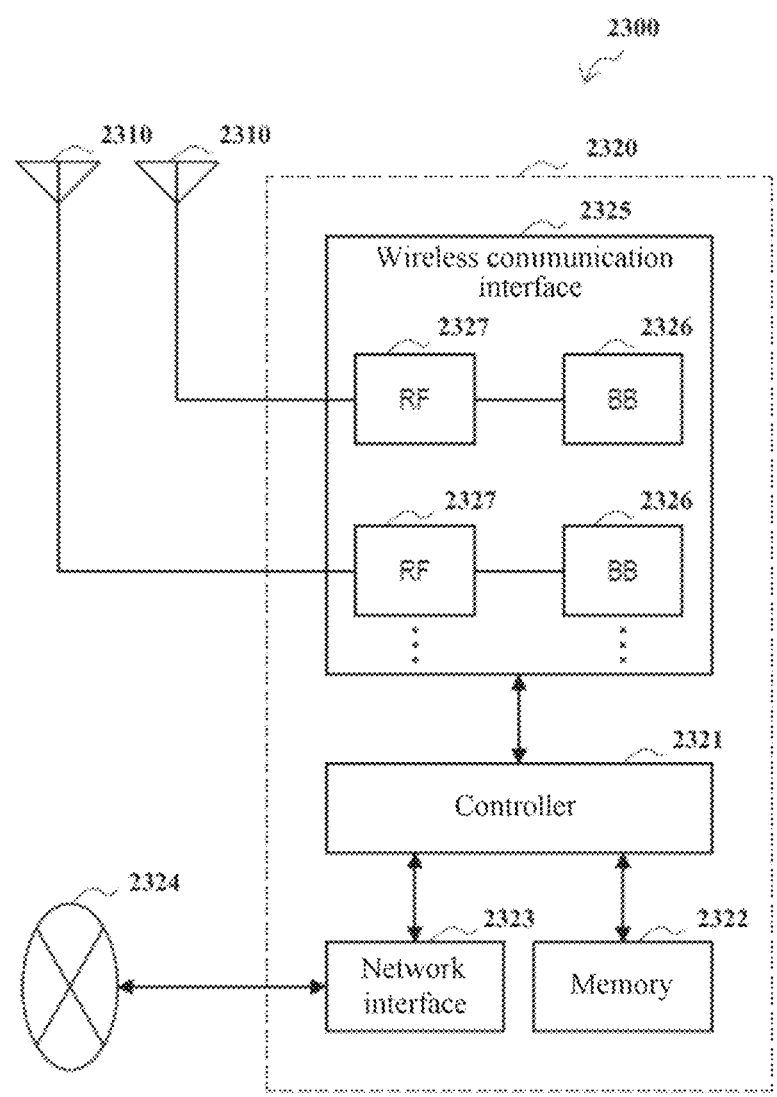
FIG. 13 is a block diagram showing an example of a schematic configuration of a gNB (a base station in a 5G system) to which the technology of the present disclosure may be applied.

FIG. 13 is a block diagram showing a example of a schematic configuration of a gNB to which the technology of the present disclosure may be applied. A gNB 2300 includes multiple antennas 2310, and a base station device 2320. The base station device 2320 may be connected to each antenna 2310 via a radio frequency (RF) cable.

Each of the antennas 2310 includes a single or multiple antenna elements (such as multiple antenna elements included in a multiple input multiple output (MIMO) antenna), and is used by the base station device 2320 to transmit and receive wireless signals. As shown in FIG. 13, the gNB 2300 may include multiple antennas 2310. For example, the multiple antennas 2310 may be compatible with multiple frequency bands used by the gNB 2300.

The base station device 2320 includes a controller 2321, a memory 2322, a network interface 2323, and a wireless communication interface 2325.

The controller 2321 may be, for example, a CPU or a DSP, and operates various functions of a higher layer of the base station device 2320. For example, the controller 2321 generates a data packet based on data in a signal processed by the wireless communication interface 2325, and transfers the generated packet via the network interface 2323. The controller 2321 may bundle data from multiple baseband processors to generate bundled packet, and transfer the generated bundled packet. The controller 2321 may have logical functions of performing control such as wireless resource control, wireless bearer control, mobility management, admission control, and scheduling. The control may be performed in conjunction with an adjacent gNB or a core network node. The memory 2322 includes RAM and ROM, and stores a program that is executed by the controller 2321, and various types of control data (such as a terminal list, transmitting power data, and scheduling data).

The network interface 2323 is a communication interface for connecting the base station device 2320 to a core network 2324. The controller 2321 may communicate with a core network node or another gNB via the network interface 2323. In that case, the gNB 2300 and the core network node or another gNB may be connected to each other through a logical interface (such as an S1 interface and an X2 interface). The network interface 2323 may be a wired communication interface or a wireless communication interface for a wireless backhaul line. If the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides wireless connection to a terminal positioned in a cell of the gNB 2300 via the antenna 2310. The wireless communication interface 2325 may typically include, for example, a BB processor 2326 and an RF circuit 2327. The BB processor 2326 may perform, for example, coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 2321, the BB processor 2326 may have a part or all of the above logical functions. The BB processor 2326 may be a memory storing communication control programs, or a module including a processor which is configured to execute the programs and a related circuit. Updating the program may allow the functions of the BB processor 2326 to be changed. The module may be a card or a blade that is inserted into a slot of the base station device 2320. Alternatively, the module may be a chip that is mounted on the card or the blade. In addition, the RF circuit 2327 may include, for example, a frequency mixer, a filter or an amplifier, and transmits and receives wireless signals via the antenna 2310.

As shown in FIG. 13, the wireless communication interface 2325 may include multiple BB processors 2326. For example, the multiple BB processors 2326 may be compatible with multiple frequency bands used by the gNB 2300. As shown in FIG. 13, the wireless communication interface 2325 may include multiple RF circuits 2327. For example, the multiple RF circuits 2327 may be compatible with multiple antenna elements. Although FIG. 13 shows an example in which the wireless communication interface 2325 includes multiple BB processors 2326 and multiple RF circuits 2327, the wireless communication interface 2325 may include a single BB processor 2326 or a single RF circuit 2327.

In the gNB 2300 shown in FIG. 13, the transceiver device of the wireless communication apparatus at the base station side according to the embodiment of the present disclosure may be implemented by the wireless communication interface 2325. At least a part of the functions of the processing circuitry and/or each unit of the electronic device or the wireless communication apparatus at the base station side according to the embodiment of the present disclosure may also be implemented by the controller 2321. For example, the controller 2321 may perform, by executing a program stored in the memory 2322, at least part of the functions of the processing circuitry and/or each unit of the electronic device or the wireless communication apparatus at the base station side according to the embodiment of the present disclosure.

Application Example of a Car Navigation Device

Figure 14:
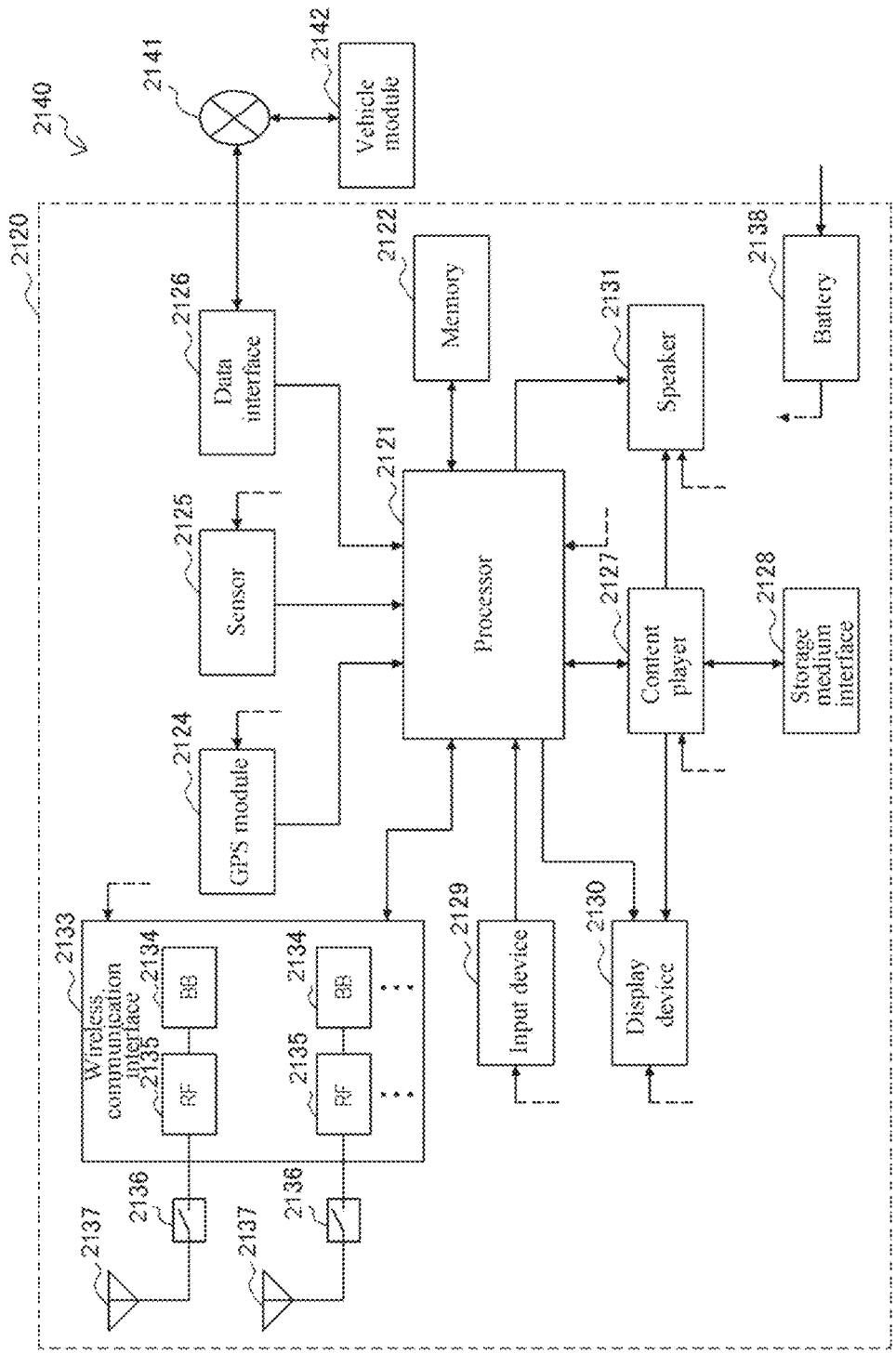
FIG. 14 is a block diagram showing an example of a schematic configuration of a car navigation device to which the technology of the present disclosure may be applied.

FIG. 14 is a block diagram showing an example of a schematic configuration of a car navigation device 2120 to which the technology according to the present disclosure may be applied. The car navigation device 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or a SoC, and controls a navigation function and another function of the car navigation device 2120. The memory 2122 includes RAM and ROM, and stores a program that is executed by the processor 2121, and data.

The GPS module 2124 uses GPS signals received from a GPS satellite to measure a position (such as a latitude, a longitude, and an altitude) of the car navigation device 2120. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data generated by the vehicle, such as vehicle speed data.

The content player 2127 reproduces content stored in a storage medium (such as a CD and a DVD) that is inserted into the storage medium interface 2128. The input device 2129 includes, for example, a touch sensor configured to detect touch on a screen of the display device 2130, a button, or a switch, and receives an operation or information inputted by a user. The display device 2130 includes a screen such as a LCD or an OLED display, and displays an image of the navigation function or a content that is reproduced. The speaker 2131 outputs a sound of the navigation function or a content that is reproduced.

The wireless communication interface 2133 supports any cellular communication scheme (such as LTE and LTE-Advanced), and performs wireless communication. The wireless communication interface 2133 may generally include, for example, a BB processor 2134 and an RF circuit 2135. The BB processor 2134 may perform, for example, encoding/decoding, modulating/demodulating, and multiplexing/demultiplexing, and performs various types of signal processing for wireless communication. In addition, the RF circuit 2135 may include, for example, a frequency mixer, a filter, and an amplifier, and transmits and receives wireless signals via the antenna 2137. The wireless communication interface 2133 may also be a chip module that has the BB processor 2134 and the RF circuit 2135 integrated thereon. The wireless communication interface 2133 may include multiple BB processors 2134 and multiple RF circuits 2135, as shown in FIG. 14. Although FIG. 14 shows the example in which the wireless communication interface 2133 includes the multiple BB processors 2134 and the multiple RF circuits 2135, the wireless communication interface 2133 may include a single BB processor 2134 or a single RF circuit 2135.

Furthermore, in addition to a cellular communication scheme, the wireless communication interface 2133 may support another type of wireless communication scheme such as a short-distance wireless communication scheme, a near field communication scheme, and a wireless LAN scheme. In that case, the wireless communication interface 2133 may include the BB processor 2134 and the RF circuit 2135 for each wireless communication scheme.

Each of the antenna switches 2136 switches connection destinations of the antennas 2137 among multiple circuits (such as circuits for different wireless communication schemes) included in the wireless communication interface 2133.

Each of the antennas 2137 includes a single or multiple antenna elements (such as multiple antenna elements included in an MIMO antenna), and is used by the wireless communication interface 2133 to transmit and receive wireless signals. The car navigation device 2120 may include multiple antennas 2137, as shown in FIG. 14. Although FIG. 14 shows the example in which the car navigation device 2120 includes the multiple antennas 2137, the car navigation device 2120 may include a single antenna 2137.

Furthermore, the car navigation device 2120 may include the antenna 2137 for each wireless communication scheme. In that case, the antenna switches 2136 may be omitted from the configuration of the car navigation device 2120.

The battery 2138 supplies power to various components of the car navigation device 2120 shown in FIG. 14 via feeder lines that are partially shown as dashed lines in the FIG. 14. The battery 2138 accumulates power supplied form the vehicle.

In the car navigation device 2120 shown in FIG. 14, the transceiver device or the transceiver unit of the wireless communication apparatus according to the embodiment of the present disclosure may be implemented by the wireless communication interface 2133. At least a part of the functions of the processing circuit and/or each unit of the electronic device or the wireless communication apparatus according to the embodiment of the present disclosure may also be implemented by the processor 2121.

The technology of the present disclosure may also be implemented by an in-vehicle system (or a vehicle) 2140 including one or more components of car navigation device 2120, the in-vehicle network 2141 and a vehicle module 2142. The vehicle module 2142 generates vehicle data (such as a vehicle speed, an engine speed, and fault information), and outputs the generated data to the in-vehicle network 2141.

In the above description of specific embodiments of the present disclosure, the features described and/or illustrated for one embodiment may be used in one or more other embodiments in the same or similar manner, may be combined with features in the other embodiments, or may replace the features in the other embodiments.

It should be emphasized that the term "including/comprising", when used herein, refers to the presence of a feature, an element, a step or a component, but does not exclude the presence or addition of one or more other features, elements, steps or components.

In the above embodiments and examples, numerals are used to indicate each step and/or unit. It should be understood by those skilled in the art that these reference signs are used only for convenience of description and drawing, and do not indicate their order or make any other limitation.

In addition, the method of the present disclosure is not limited to being performed in the chronological order described in the specification, but may also be performed in other chronological order, in parallel, or independently. Therefore, the performing order of the method described in this specification does not limit the technical scope of the present disclosure.

Although the present disclosure has been disclosed above through the description of specific embodiments of the present disclosure, it should be understood that all the embodiments and examples described above are illustrative and not restrictive. Those skilled in the art may make various modifications, improvements, or equivalents to the present disclosure within the spirit and scope of the claims. These modifications, improvements or equivalents should also be considered to be included in the protection scope of the present disclosure.

The invention claimed is:

1. An electronic device configured to operate as a user equipment for wireless communication, comprising:
   a processing circuitry configured to:
   perform beamforming-based sidelink communication with another user equipment via a transmission beam and a reception beam, the beamforming-based sidelink communication performed in accordance with a beam management mode selected by the processing circuitry from a predetermined set of beam management modes, the beamforming-based sidelink communication comprising:
   measuring a stability of the beamforming-based sidelink communication,
   selecting the beam management mode from the predetermined set of beam management modes based on the measured stability of the beamforming-based sidelink communication,
   transmitting an identifier that identifies the selected the beam management mode to the another user equipment, and
   transceiving information with the another user equipment in accordance with the selected the beam management mode,
   wherein the selecting the beam management mode comprises:

based on the measured stability of the beamforming-based sidelink communication being below a predetermined threshold, selecting a first beam management mode, in which:
  the transmission beam is determined based on a measurement with respect to a corresponding transmission beam reference signal, and
  the reception beam is determined based on a measurement with respect to a corresponding reception beam reference signal; and
based on the measured stability of the beamforming-based sidelink communication being above the predetermined threshold, selecting a second management mode, in which only one of the transmission beam or the reception beam is determined based on the measurement with respect to the corresponding beam reference signal, and another of the transmission beam or the reception beam is determined based on a criterion other than the measurement with respect to the corresponding beam reference signal.

2. The electronic device of claim 1, wherein at least one of the transmission beam or the reception beam is determined based on the at least one of position information of the another user equipment or position information of the electronic device.

3. The electronic device of claim 1, wherein the measured stability of the beamforming-based sidelink communication is based on at least two separate measurements of a reference signal received power (RSRP) performed by one of the electronic device or the another user equipment.

4. The electronic device of claim 1, wherein each of the transmission beam reference signal and the reception beam reference signal comprises one of a sounding reference signal, a sidelink synchronization signal or a sidelink beam management reference signal.

5. The electronic device of claim 1, wherein the processing circuitry is further configured to transmit the transmission beam reference signal to the another user equipment along with each of the following information:
  a type of the transmission beam reference signal;
  a time-frequency resource position of the transmission beam reference signal; and
  a beam identification corresponding to the transmission beam reference signal.

6. The electronic device of claim 1, wherein one of the transmission beam reference signal or the reception beam reference signal is transmitted using a resource allocated by a base station.

7. The electronic device of claim 1, wherein the processing circuitry is configured to receive the reception beam reference signal from the another user equipment, and the processing circuitry is further configured to receive each of the following information transmitted by a base station:
  a type of the reception beam reference signal;
  a time-frequency resource position of the reception beam reference signal; and
  a beam identification corresponding to the reception beam reference signal,
  wherein position information of the another user equipment and position information of the electronic device comprises corresponding device longitude and latitude, orientation and speed information, and
  wherein the processing circuitry is configured to broadcast the position information of the electronic device and receive broadcasted position information of the another user equipment.

8. The electronic device of claim 1, wherein the processing circuitry is further configured to perform a reception beam scan, based on a sidelink communication reception failure.

9. The electronic device of claim 1, wherein the processing circuitry is configured to:
  transmit the transmission beam reference signal to the another user equipment;
  receive feedback information transmitted by the another user equipment based on the measurement with respect to the transmission beam reference signal; and
  determine the transmission beam based on the feedback information.

10. The electronic device of claim 1, wherein the processing circuitry is configured to:
  receive the reception beam reference signal from the another user equipment;
  perform the measurement with respect to the reception beam reference signal; and
  determine the reception beam based on the measurement with respect to the reception beam reference signal.

11. The electronic device of claim 1, wherein the transmission beam reference signal is one of a plurality of transmission beam reference signals, and the processing circuitry is configured to periodically transmit, to the another user equipment, the plurality of transmission beam reference signals on a respective plurality of beams.

12. The electronic device of claim 1, wherein the reception beam reference signal is one of a plurality of reception beam reference signals periodically transmitted by the another user equipment on a respective plurality of beams, and the processing circuitry is configured to perform measurement with respect to the plurality of reception beam reference signals.

13. The electronic device of claim 1, wherein the processing circuitry is further configured to receive, from the another user equipment, indication information indicating a link failure.

14. The electronic device of claim 1, wherein the processing circuitry is further configured to determine a recovery mode for the beamforming-based sidelink communication based on predetermined sidelink communication service requirements,
  wherein the recovery mode comprises one of:
  a reselect-request recovery mode,
  a multi-beam mode, or
  a beam widening mode.

15. A method performed by an electronic device for a user equipment in a wireless communication, the method comprising:
  performing beamforming-based sidelink communication with another user equipment via a transmission beam and a reception beam, the beamforming-based sidelink communication performed in accordance with a beam management mode selected by the processing circuitry from a predetermined set of beam management modes, the beamforming-based sidelink communication comprising:
  measuring a stability of the beamforming-based sidelink communication,
  selecting the beam management mode from the predetermined set of beam management modes based on the measured stability of the beamforming-based sidelink communication,
  transmitting an identifier that identifies the selected the beam management mode to the another user equipment, and transceiving information with the another user equipment in accordance with the selected the beam management mode, wherein the selecting the beam management mode comprises:

based on the measured stability of the beamforming-based sidelink communication being below a predetermined threshold, selecting a first beam management mode, in which:

the transmission beam is determined based on a measurement with respect to a corresponding transmission beam reference signal, and the reception beam is determined based on a measurement with respect to a corresponding reception beam reference signal; and based on the measured stability of the beamforming-based sidelink communication being above the predetermined threshold, selecting a second management mode, in which only one of the transmission beam or the reception beam is determined based on the measurement with respect to the corresponding beam reference signal, and another of the transmission beam or the reception beam is determined based on a criterion other than the measurement with respect to the corresponding beam reference signal.

16. A non-transitory computer readable product containing instructions to cause an electronic device for a user equipment in a wireless communication to perform a method, the method comprising:

performing beamforming-based sidelink communication with another user equipment via a transmission beam and a reception beam, the beamforming-based sidelink communication performed in accordance with a beam management mode selected by the processing circuitry from a predetermined set of beam management modes, the beamforming-based sidelink communication comprising:

measuring a stability of the beamforming-based sidelink communication, selecting the beam management mode from the predetermined set of beam management modes based on the measured stability of the beamforming-based sidelink communication, transmitting an identifier that identifies the selected the beam management mode to the another user equipment, and transceiving information with the another user equipment in accordance with the selected the beam management mode, wherein the selecting the beam management mode comprises:

based on the measured stability of the beamforming-based sidelink communication being below a predetermined threshold, selecting a first beam management mode, in which:

the transmission beam is determined based on a measurement with respect to a corresponding transmission beam reference signal, and the reception beam is determined based on a measurement with respect to a corresponding reception beam reference signal; and based on the measured stability of the beamforming-based sidelink communication being above the predetermined threshold, selecting a second management mode, in which only one of the transmission beam or the reception beam is determined based on the measurement with respect to the corresponding beam reference signal, and another of the transmission beam or the reception beam is determined based on a criterion other than the measurement with respect to the corresponding beam reference signal.

\* \* \* \* \*